United States Patent [19]
Kouno et al.

[11] Patent Number: 5,850,886
[45] Date of Patent: Dec. 22, 1998

[54] STEERING CONTROL DEVICE FOR VEHICLE HAVING CONTINUOUSLY VARIABLE TRANSMISSION

[75] Inventors: Masakatsu Kouno; Katsuhisa Ichikawa; Masahide Shinokawa; Nobuo Yamazaki, all of Wako, Japan

[73] Assignee: Honda Giken Kogyo Kabushiki Kaisha, Tokyo, Japan

[21] Appl. No.: 683,089

[22] Filed: Jul. 18, 1996

[30] Foreign Application Priority Data

Jul. 20, 1995 [JP] Japan ................................ 7-183772

[51] Int. Cl.⁶ .................................................... B62D 11/04
[52] U.S. Cl. ....................... 180/6.24; 180/6.48; 180/6.62; 180/307; 180/308
[58] Field of Search ................................ 180/6.24, 6.62, 180/6.3, 6.32, 6.4, 6.48, 305, 307, 308, 367

[56] References Cited

U.S. PATENT DOCUMENTS

| | | | |
|---|---|---|---|
| 4,273,206 | 6/1981 | van der Lely | 180/6.24 |
| 4,484,655 | 11/1984 | Sheppard | 180/308 |
| 4,616,724 | 10/1986 | Kwiatkowski et al. | |
| 5,540,299 | 7/1996 | Tohda et al. | 180/308 |

FOREIGN PATENT DOCUMENTS

| | | |
|---|---|---|
| 0 683 087 A1 | 11/1995 | European Pat. Off. . |
| 40-31219 | 11/1965 | Japan . |
| 49-38826 | 10/1974 | Japan . |
| 57-950 | 1/1982 | Japan . |
| 57-25428 | 5/1982 | Japan . |
| 2 173 746 | 10/1986 | United Kingdom . |
| WO 93/08063 | 4/1993 | WIPO . |

*Primary Examiner*—Anne Marie Boehler
*Attorney, Agent, or Firm*—Nikaido Marmelstein Murray & Oram, LLP

[57] ABSTRACT

Left and right driven wheels are connected to a pair of continuously variable transmissions and independently driven. The driven wheels are increased or decreased in speed at the same rotational numbers by operation of a change lever so as to move a vehicle forward or backward. When a steering angle of a steering wheel exceeds a predetermined value, an inner wheel speed during turning of the vehicle is decreased and an outer wheel speed during turning of the vehicle is increased so as to turn the vehicle. If the steering wheel becomes greater than the predetermined value during forward running of the vehicle at a low speed, the inner driving wheels stop and the vehicle does a stationary turn. However, during forward running at a high speed or backward running of the vehicle, even if the steering wheel becomes greater than the predetermined value, the vehicle does not do a stationary turn. With this arrangement, it is possible to always obtain the optimal steering characteristic in accordance with variations of the vehicle speed or the steering wheel.

23 Claims, 21 Drawing Sheets

V=5.2km/h

V=2.5km/h

V=0km/h

V=-2.4km/h

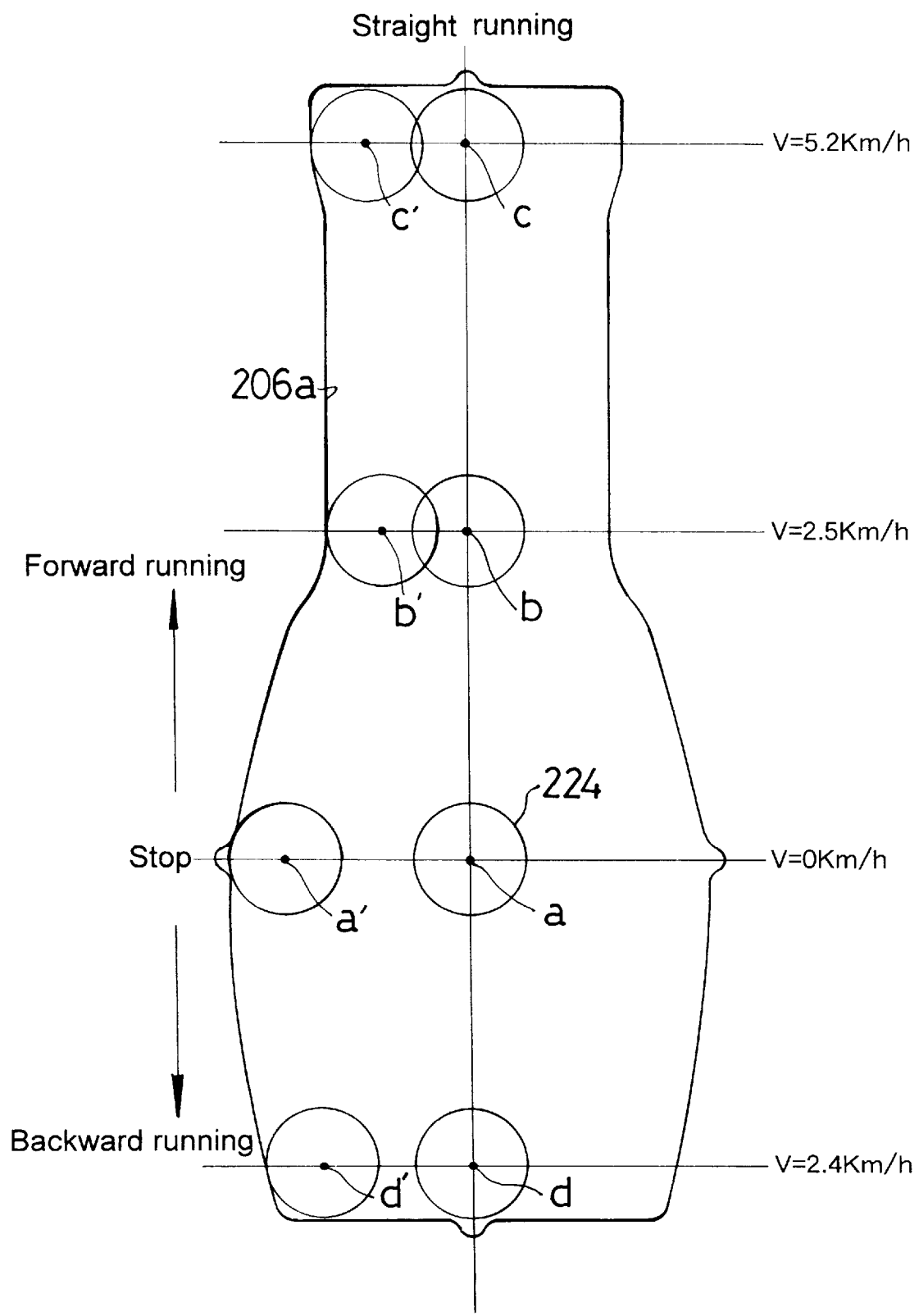

STEERING CONTROL DEVICE FOR VEHICLE HAVING CONTINUOUSLY VARIABLE TRANSMISSION

BACKGROUND OF THE INVENTION

1. Field of the Invention

The present invention relates to a steering control device for a vehicle having a continuously variable transmission which includes a pair of left and right continuously variable transmissions (such as hydrostatic continuously variable transmissions, belt-type continuously variable transmissions, cone-type continuously variable transmissions, frictional type continuously variable transmissions), in which the left and right continuously variable transmission are connected to left and right driven wheels for driving the driven wheels, and a steering wheel is connected to left and right steered wheels for steering the steered wheels.

2. Description of Related Prior Art

A steering control device for a vehicle having a hydrostatic continuously variable transmission is known from Japanese Patent Publication No.57-25428, Japanese Utility Model Publication No.49-38826, Japanese Patent Application Laid-open No.57-950 and Japanese Utility Model Publication No.40-31219.

Steering characteristics for turning of a vehicle include a neutral-steering state, an under-steering state, an over-steering state and stationary swing state. In the neutral-steering state, an inner driven wheel speed during turning and a speed of an outer driven wheel of the driven wheels during turning have a predetermined ratio suited to the turning radius so that a tendency to slip does not occur in either an inner or an outer driven wheel. In the under-steering state, the inner driven wheel speed during turning is higher than the inner driven wheel speed in the neutral-steering state. In the over-steering state, an outer driven wheel speed during turning is higher than the outer driven wheel speed in the neutral-steering state. In the stationary swing state the inner driven wheel speed during turning is zero.

In the above known steering control device, the steering characteristic, which is set based on an operation of the steering wheel, can not be changed. Therefore, it is not possible to always obtain a suitable turning characteristic in accordance with a change in a vehicle speed or a change in position of a steering wheel.

SUMMARY OF THE INVENTION

The present invention has been accomplished in view of the above circumstances, and it is an object of the invention to provide a steering control device for a vehicle having a hydrostatic continuously variable transmission in which it is possible to always obtain a suitable turning characteristic in accordance with a change in a vehicle speed or a change in position of a steering wheel.

To achieve the above object, according to a first feature of the invention, there is provided a steering control device for a vehicle having a pair of continuously variable transmissions. Left and right driven wheels are connected to the pair of continuously variable transmissions and driven independently. Left and right wheels to be steered are connected to a steering wheel. The steering control device controls a transmission ratio of the pair of continuously variable transmissions in accordance with the position of the steering wheel so as to turn the vehicle. When the steering wheel becomes equal to or greater than a first predetermined steering angle of the steering wheel, the transmission ratio is controlled such that the inner wheel speed during turning of the vehicle is decreased and the outer wheel speed during turning of the vehicle is increased.

With the above arrangement, when the steering angle becomes equal to or greater than a predetermined steering angle, the inner driven wheel speed during turning of the vehicle is decreased and the outer driven wheel speed is increased. Therefore, it is possible to set the turning speed and turning radius to ideal values in accordance with the steering angle, to enhance working efficiency and to alleviate fatigue of the driver.

Further, according to a second feature, there is provided a steering control device for a vehicle having a pair of continuously variable transmission. Left and right driven wheels are connected to the pair of continuously variable transmissions and driven independently. Left and right wheels to be steered are connected to a steering wheel. The steering control device controls a transmission ratio of the pair of continuously variable transmissions in accordance with the position of the steering wheel so as to turn the vehicle. As the steering angle increases, an inner wheel speed during turning of the vehicle is decreased and an outer wheel speed during turning of the vehicle is increased. When the steering angle approaches a limit steering angle, the inner wheel speed during turning of the vehicle becomes zero and a stationary turn of the vehicle is conducted.

With the above arrangement, as the steering angle is increased, the inner driven wheel speed is decreased and the outer driven wheel speed is increased. When the steering angle approaches the steering angle limit, the inner driven wheel speed becomes zero to conduct a turning of the vehicle. Therefore, it is possible to set the turning speed and turning radius to ideal values in accordance with the steering angle, to enhance working efficiency and to alleviate fatigue of the driver.

Furthermore, according to a third feature, there is provided a steering control device for a vehicle having a pair of continuously variable transmissions. Left and right driven wheels are connected to the pair of continuously variable transmissions and driven independently. Left and right wheels to be steered are connected to a steering wheel. The steering control device controls a transmission ratio of the pair of continuously variable transmissions in accordance with the position of the steering wheel so as to turn the vehicle. The steering control device includes a mixing lever, a change lever and a guide member. The mixing lever is pivotally supported at one end thereof for longitudinal swinging movement and lateral swinging movement so as to operate a speed adjusting member for each of the pair of continuously variable transmissions in order to control the transmission ratio of the pair continuously variable transmissions. The change lever longitudinally swings the mixing lever to increase or decrease the number of rotations of the pair of continuously variable transmissions at substantially the same values. The guide member is laterally swung by the steering wheel and has a guide groove which extends longitudinally and into which the other end of the mixing lever is loosely fitted. A width of the guide groove in a lateral direction is set at a wide position corresponding to the mixing lever at the time of forward running of the vehicle at a low speed and at the time of backward running of the vehicle at a low speed and is set at a narrow position corresponding to the mixing lever at the time of forward running of the vehicle at a high speed.

With the above arrangement, if the vehicle speed is initially set by the change lever, it is possible to turn the vehicle arbitrarily only by operating the steering wheel, which can enhance working efficiency and alleviate fatigue of the driver. Further, the width of the guide groove in the lateral direction is set at a wide position corresponding to the mixing lever at the time of forward running a low speed as well as at the time of backward running at a low speed, and is set at a narrow position corresponding to the mixing lever at the time of forward running at a high speed. Therefore, when the vehicle runs forward or backward at a low speed, a difference in speed is generated between the inner and outer wheels during turning after the steering angle becomes large. As a result, a degree of response of the steering operation becomes low. When the vehicle runs forward at a high speed, a difference in speed is generated between the inner and outer wheels during turning even if the steering angle is small. As a result, the degree of response of the steering operation becomes low. Thus, it is possible to achieve an appropriate turning performance of the vehicle suitable for the vehicle speed.

The above and other objects, features and advantages of the invention will become apparent from the following description of a preferred embodiment taken in conjunction with the accompanying drawings.

BRIEF DESCRIPTION OF THE DRAWINGS

FIGS. 1 to 22 show one embodiment of the present invention, wherein:

FIG. 1 is a side view of entire utility vehicle;

FIG. 2 is a view taken in the direction of the arrow 2 in FIG. 1;

FIG. 3 is an enlarged view of an essential portion of FIG. 1;

FIG. 4 is an enlarged view of another essential portion of FIG. 1;

FIG. 5 is an enlarged view of an essential portion of FIG. 2;

FIG. 6 is an enlarged view of another essential portion of FIG. 2;

FIG. 7 is an enlarged view of an essential portion of FIG. 4;

FIG. 8 is a sectional view taken along the line 8—8 in FIG. 7 (a continuously variable transmission is not cut);

FIG. 9 is an enlarged view of an essential portion of FIG. 8;

FIG. 10 is an enlarged view of another essential portion of FIG. 8;

FIG. 11 is a sectional view taken along the line 11—11 in FIG. 7;

FIG. 12 shows a hydraulic pressure circuit;

FIG. 13 is an enlarged sectional view taken along the line 13—13 in FIG. 6;

FIG. 14 is a sectional view taken along the line 14—14 in FIG. 13;

FIG. 15 is a view taken in the direction of the arrow 15 in FIG. 13;

FIG. 16 is a sectional view taken along the line 16—16 in FIG. 13;

FIG. 17 is a view taken in the direction of the arrow 17 in FIG. 13;

FIG. 18 is a sectional view taken along the line 18—18 in FIG. 17;

FIG. 20 is an illustration also for explaining the operation of the present invention;

FIG. 21 is a graph showing a relationship between a steering angle and a ratio of wheel speeds; and FIG. 22 is a graph showing the number of rotations of an axle when a steering wheel is turned to a steering angle limit.

DETAILED DESCRIPTION OF THE PREFERRED EMBODIMENTS

Figure 1:
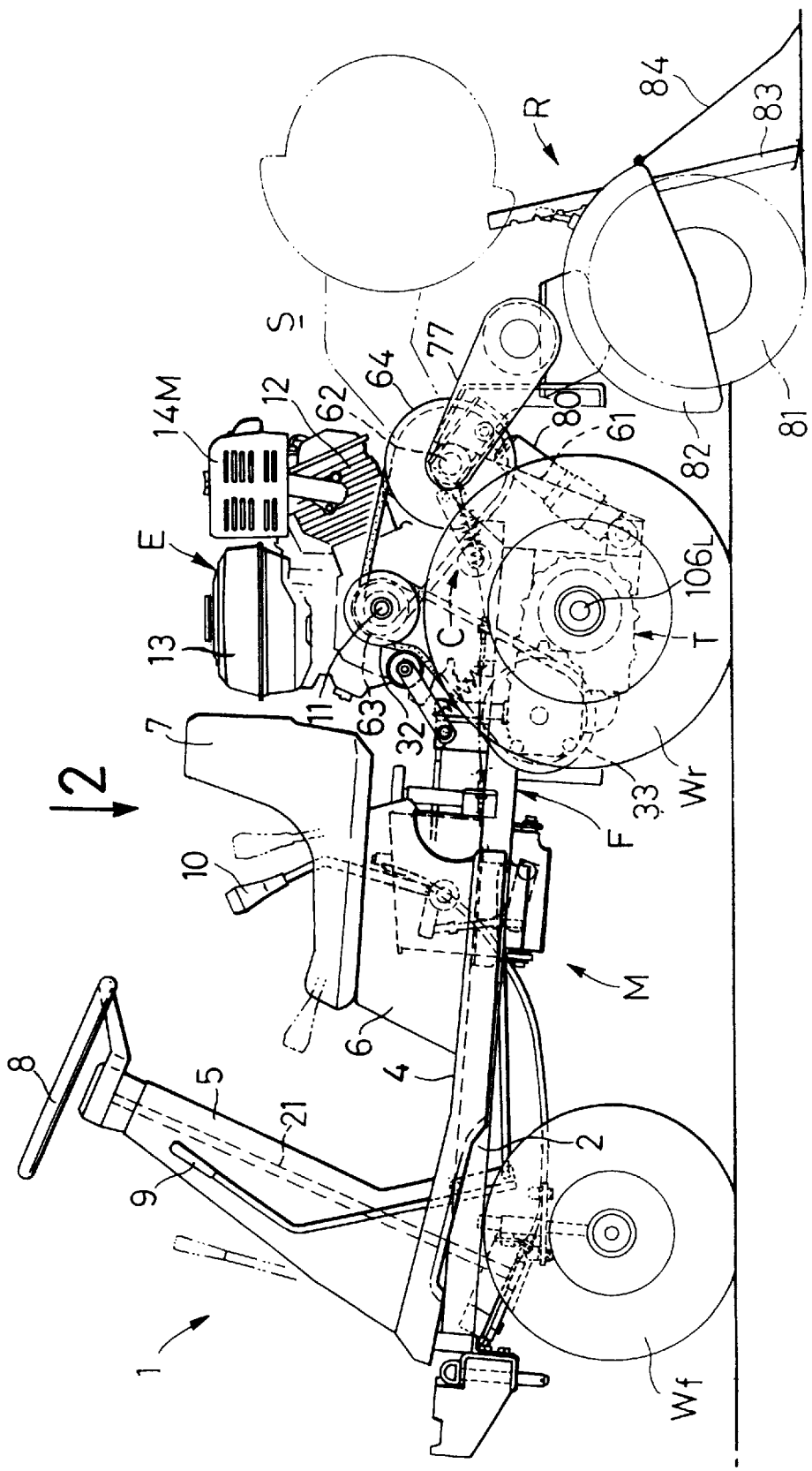
Figure 2:
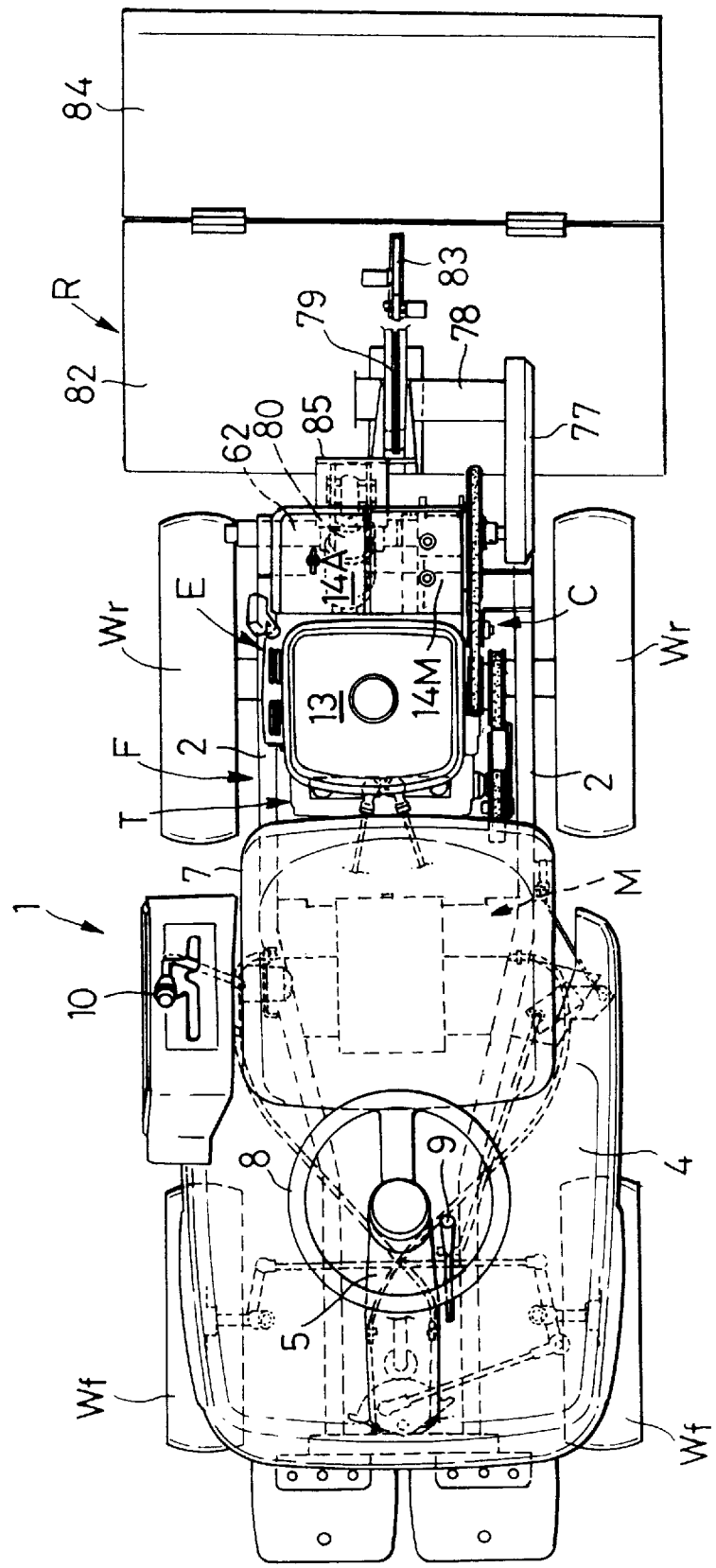

Referring to FIGS. 1 and 2, a riding-type utility vehicle 1 includes a pair of left and right front wheels Wf, Wf as steered wheels, a pair of left and right rear wheels Wr, Wr as driven wheels, and a vehicle frame F. The vehicle frame F includes a pair of left and right side frames 2, 2 extending in a longitudinal direction of a vehicle body of the utility vehicle 1, and five cross frames $3_{1\ to\ 35}$ for connecting both the side frames 2, 2 (see FIG. 5). A floor panel 4, a handle post 5 and a seat base 8 are mounted at a front portion of the vehicle frame F. A seat 7 for a passenger is mounted on the seat base 6. A steering wheel 8 is provided on an upper portion of the handle post 5 for steering the left and right front wheels Wf, Wf, and for generating a difference in the number of rotations of the left and right rear wheels Wr, Wr through a hydrostatic continuously variable transmission which will be described hereinafter. The steering wheel 8 may be of any type such as a rounded steering wheel, a steering bar, a rectangle shaped steering wheel or a steering lever. At the left side of the steering wheel post 5, there is provided a clutch lever 9 for turning on or off the tension clutch which controls power transmission to the utility machine (which will be described later), and at the right side of the seat 7, a change lever 10 is provided for moving the working vehicle 1 back and forth.

A single-cylinder 4-cycle engine E is provided on an upper surface of a rear portion of the vehicle body such that a crankshaft 11 is directed in a lateral direction of the vehicle body and a cylinder 12 is directed rearwardly and upwardly. A fuel tank 13, air cleaner (not shown) and a muffler 14M are supported on an upper portion of the engine E. A transmission T is provided at a lower portion of the engine E for converting a driving force of the engine E into a hydraulic pressure to drive the left and right rear wheels Wr, Wr. A transmission operating device M is mounted on a lower portion of the seat 7. The transmission operating device M mixes the operations of both the steering wheel 8 and the change lever 10 and transmits the mixed operations to the transmission T, so as to independently control the number of rotations of the left and right rear wheels Wr, Wr. A rotary utility machine R, driven by the engine E, is connected to a rear end of the vehicle body.

Figure 3:
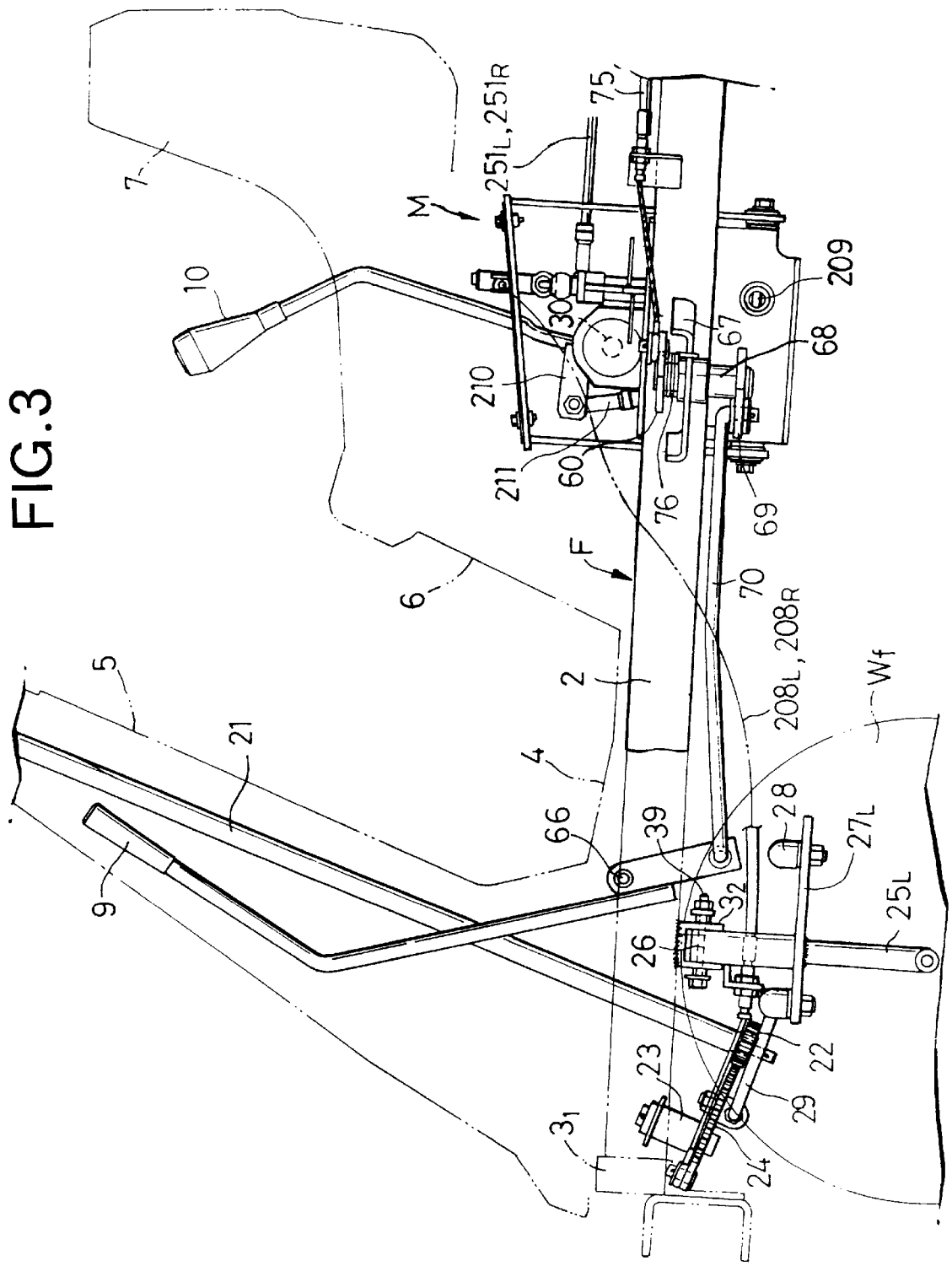
Figure 5:
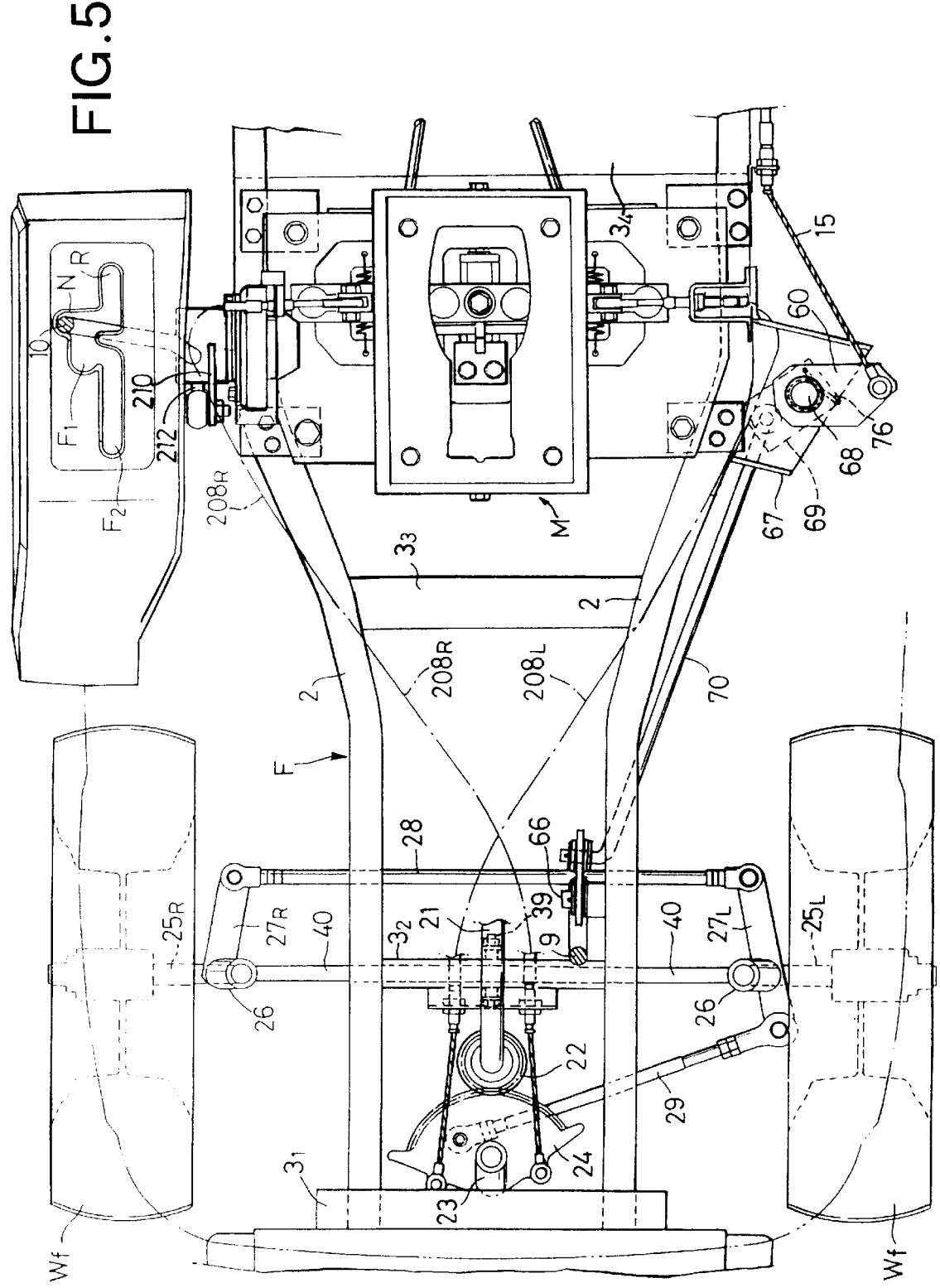

As shown in FIG. 3 and FIG. 5, a gear 22 is secured to the lower end of a steering shaft 21 connected to the steering handle 8. A sector gear 24, pivotally supported by a pivot 23, is engaged with the gear 22. Right and left knuckles $25_R$, $25_L$ for pivotally supporting the right and left front wheels Wf are shaped in an L-form, and are supported so as to freely swivel on guide tubes 26, 26 (which corresponding to king pins), which are provided at right and left ends of a front axle 40. The front axle 40 is laterally swingably pivoted on the lower part of the cross frame through a stepped bolt 39. Right and left knuckle arms $27_R$, $27_L$ secured respectively to the knuckles $25_R$, $25_L$ are mutually connected through a tie rod 28. The left knuckle arm $27_L$ and sector gear 24 are mutually connected through a steering rod 29.

When the steering wheel 8 is operated, the left front wheel Wf is steered through the steering shaft 21, gear 22, sector gear 24, steering rod 29, left knuckle arm $27_L$, and left knuckle $25_L$. The right front wheel Wf is steered from the left side knuckle arm $27_L$ through the tie rod 28, right knuckle arm $27_R$ and right knuckle $25_R$. The maximum steering angle (i.e., the limit steering angle) of the steering wheel 8 is rotated 360° each for clockwise and counterclockwise rotation. When the steering wheel 8 is rotated 360°, the steered angle of the inner front wheel Wf during turning of the vehicle is set at 57° to 60°. The range of the steered angle is set such that the vehicle can turn smoothly during stationary turning, and such that the vehicle can stably travel at the time of slalom at a high speed.

Figure 4:
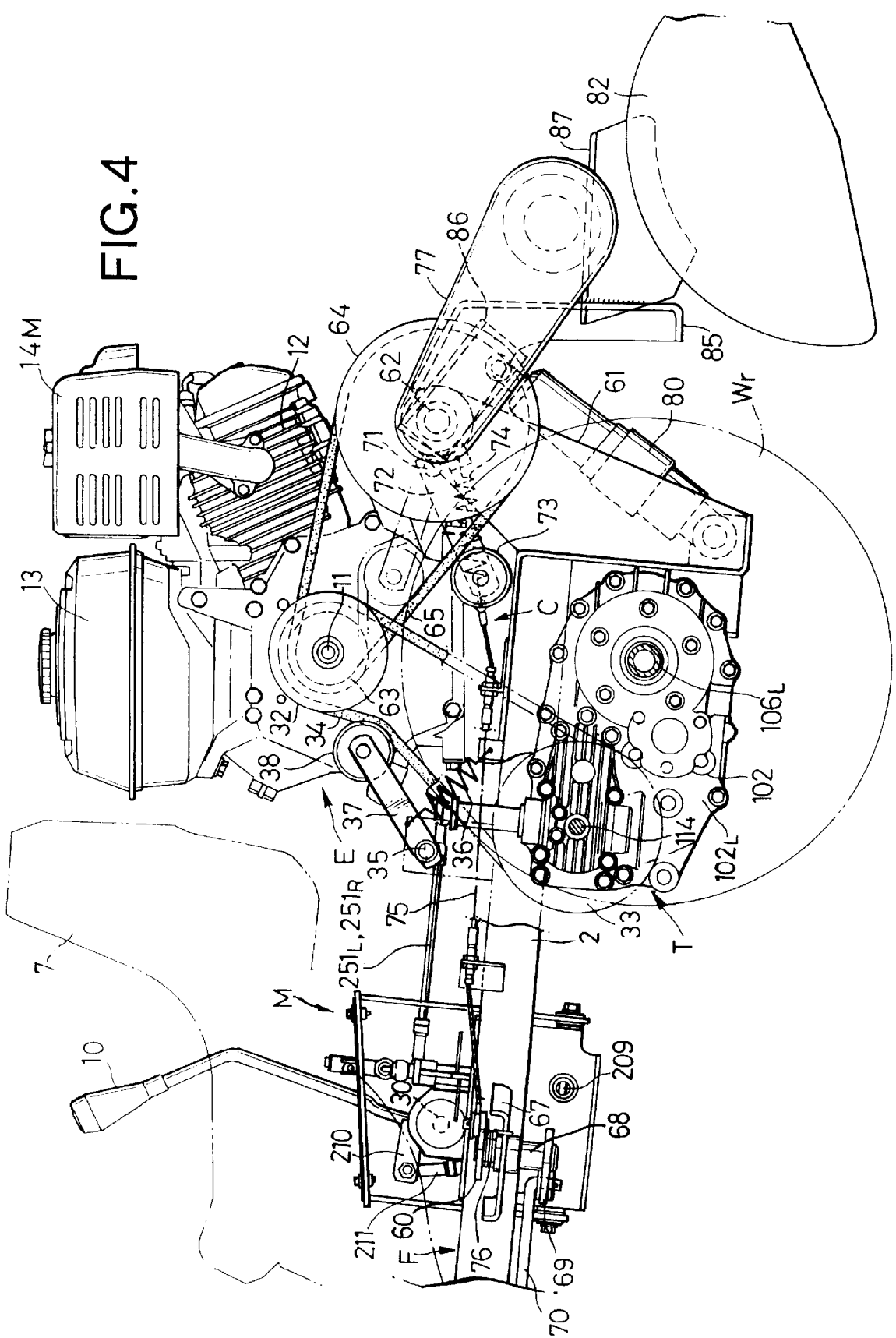
Figure 6:
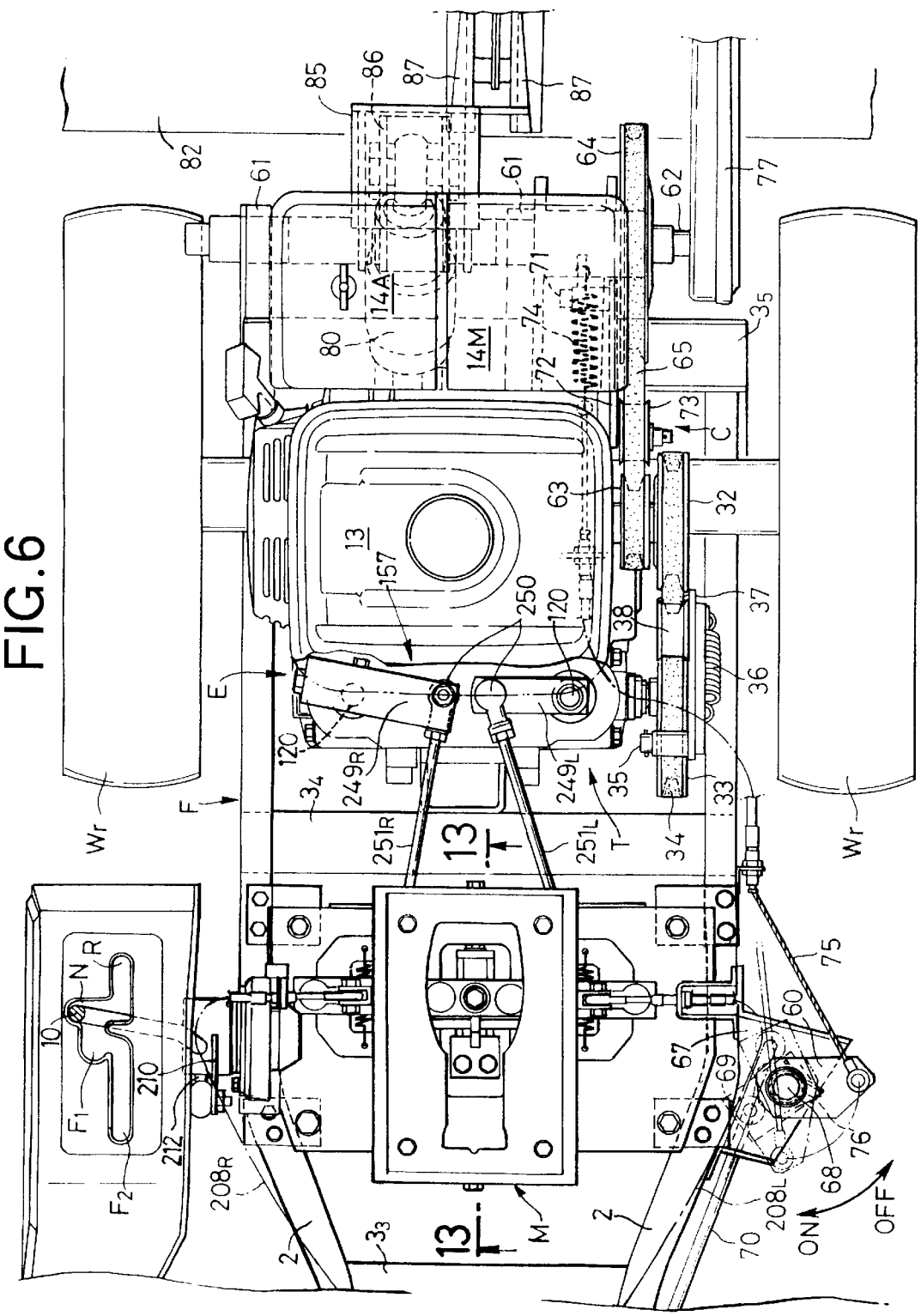

As shown in FIG. 4 and FIG. 6, the change lever 10 is pivoted for swinging movement longitudinally and laterally through a pivot 30 which extends in the lateral direction of the vehicle body. When the change lever 10 is at a neutral position N, the working vehicle 1 is stopped. When the change lever 10 is swung forward from the neutral position, the working vehicle 1 begins to run or travel forward at 0 km/h to +5.2 km/h. When the forward swing angle is 14°, the change lever 10 is at the working top position $F_1$, and the vehicle speed is +2.5 km/h. When the forward swing angle is 42°, the change lever 10 is at the running top position $F_2$, and the vehicle speed is +5.2 km/h. When the change lever 10 is swung rearward from the neutral position, the working vehicle 1 begins to run or travel backward at 0 km/h to -2.4 km/h. At the rearward swing angle of 20°, the change lever 10 is at the reverse top position R, and the vehicle speed is -2.4 km/h.

The maximum forward vehicle speed of +5.2 km/h, and the maximum reversal vehicle speed of -2.4 km/h can be changed arbitrarily.

If a diameter of each of the driven rear wheels Wr, Wr is enlarged to 1.15 times, the above-mentioned various speeds will be increased by the same ratio. In this case, the vehicle speed of 2.5 km/hr is increased to 2.8 km/hr to 2.9 km/hr, the maximum forward speed of 5.2 km/hr is increased to 6.0 km/hr, and the maximum backward speed of -2.4 km/hr is increased to -2.7 km/hr to -2.8 km/hr.

Referring to FIGS. 7 to 12, the structure of the transmission system T for transmitting a driving force of the engine E to the right and left rear wheels Wr is described below.

Figure 7:
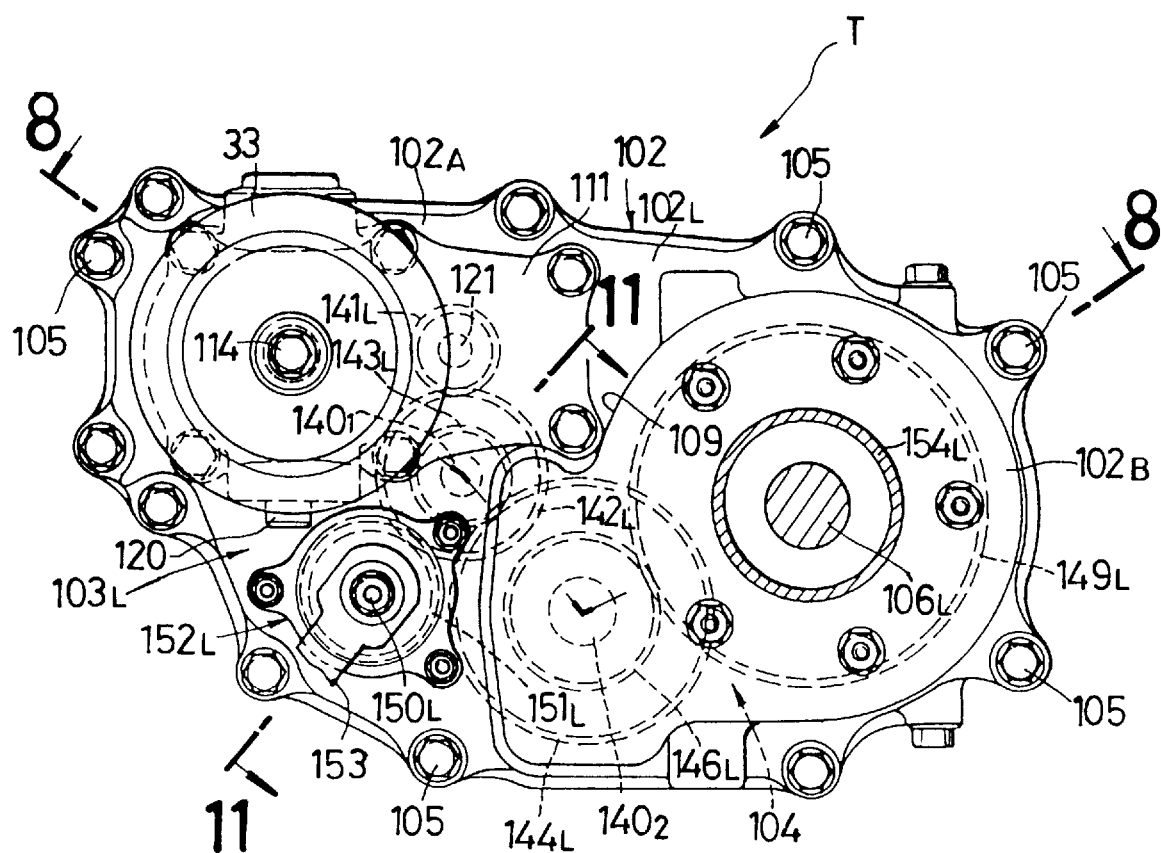
Figure 8:
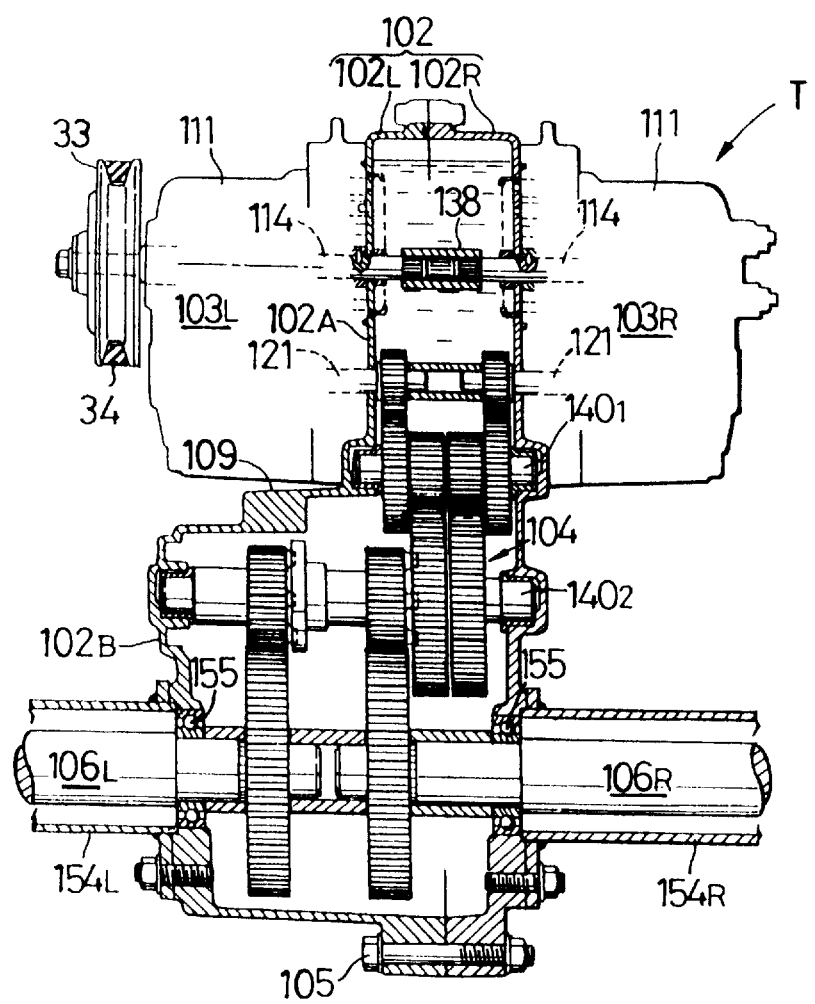

In FIGS. 7 and 8, the transmission system T includes a transmission case 102, a pair of hydrostatic continuously variable transmissions $103_R$, $103_L$ provided on the right and left sides of the transmission case 102 respectively, a speed reduction device 104 disposed in the transmission case 102, and a pair of axles $106_R$, $106_L$ penetrating through right and left side walls of the transmission case 102 respectively. Right and left rear wheels Wr are provided at outer ends of the axles $106_R$, $106_L$.

The transmission case 102 is formed by joining open ends of right case half $102_R$ and left case half $102_R$, split on a plane orthogonal to an axial line of the axles $106_R$, $106_L$, separably through bolts 105. The outer side of the left case half $102_L$ is more projected at its lower half than at its upper half, so as to form a step 109 therebetween. The right case half $102_R$ is formed generally flat on the outer side surface. In this way, the transmission case 102 has a narrow portion $102_A$ above the step 109 and a wide portion $102_B$ below the step 109. A pair of hydrostatic continuously variable transmissions $103_R$, $103_L$ are provided on the right and left sides of the narrow portion $102_A$.

The right and left axles $106_R$, $106_L$ are supported within cylindrical axle cases $154_R$, $154_L$ by bearing 155, 155 mounted on right and left side walls of the wide portion $102_B$ of the transmission case 102.

Figure 9:
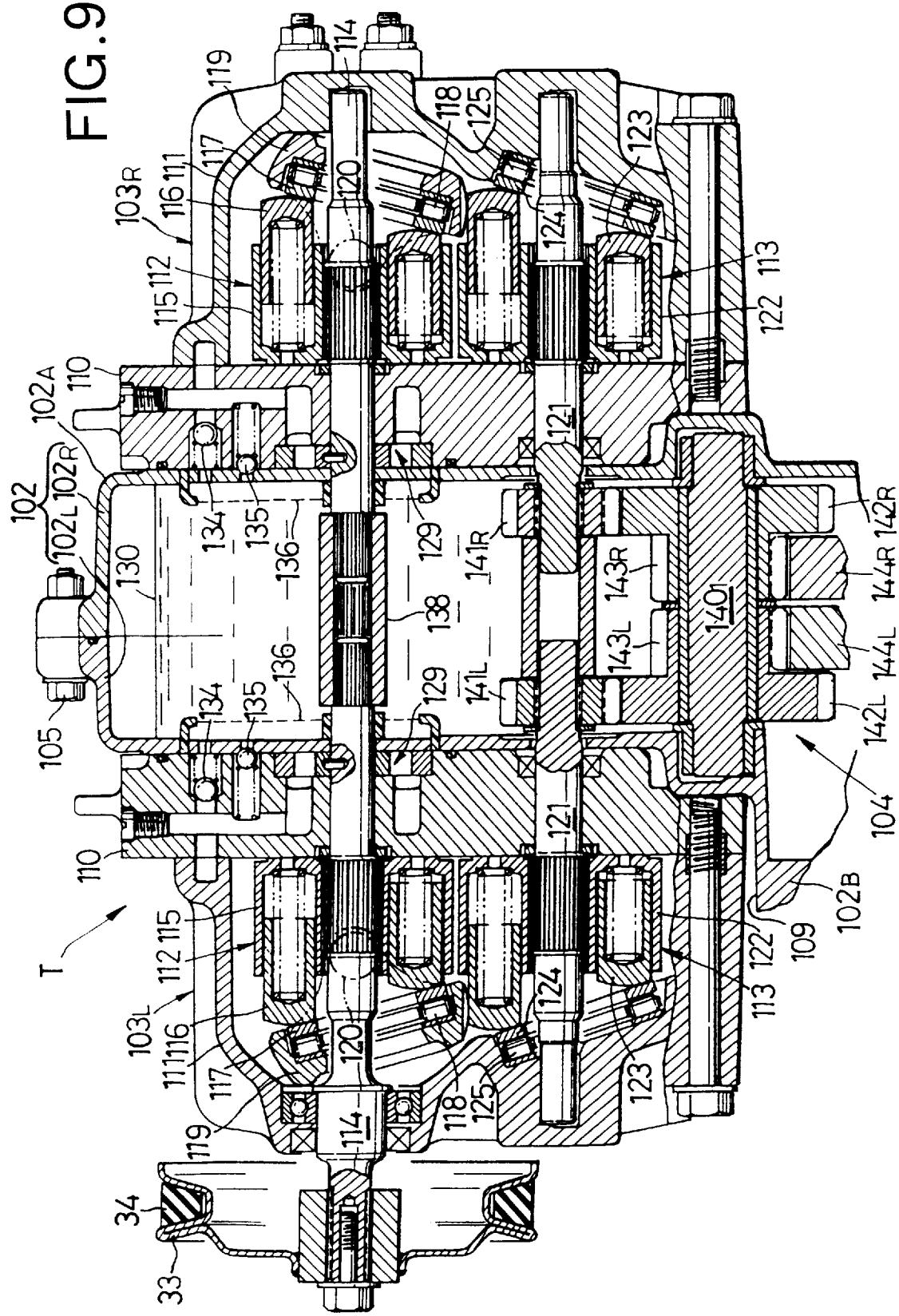

As shown in FIGS. 7 and 9, right and left hydrostatic continuously variable transmissions $103_R$, $103_L$ are identical in structure, and disposed symmetrically. Each of the hydrostatic continuously variable transmissions $103_R$, $103_L$ includes a distribution plate 110 bolted separably to the outer side of the case halves $102_R$, $102_L$. A housing 111 is bolted to this distribution plate 110. A hydraulic pump 112 and a hydraulic motor 113 are disposed in the housing 111. The hydraulic pump 112 includes a) a pump shaft 114 penetrating through the distribution plate 110, b) pump cylinders 115 spline coupled to the pump shaft 114 and slidably and rotatably connected closely with the distribution plate 110, c) multiple pump plungers 116 slidably fitted to the pump cylinders 115 in an annular arrangement surrounding the pump shaft 114, d) a pump swash plate 117 abutting against outer ends of the pump plungers 116, and e) a swash plate holder 119 for bearing the back side of the plate 117 with a thrust bearing 118. The swash plate holder 119 is supported on the housing 111 through a pair of swash plates 120 which have an axial line which is orthogonal to the axial line of the pump shaft 114. The pump swash plate 117 is tillable between one maximum inclination position (forward top position) and another maximum inclination position (reverse top position) through an erect position (neutral position) orthogonal to the pump shaft 114. At the outer ends of the swash plates 120 of the right and left swash plate holders 119, speed change arms $249_R$, $249_L$ (see FIG. 6) are secured. By turning these speed change arms $249_R$, $249_L$ the angle of each swash plate 117 can be adjusted.

The hydraulic motor 113 includes a) a motor shaft 121 penetrating through the distributing plate 110, b) motor cylinders 122 spline coupled with the motor shaft 121 and slidably and rotatably connected closely with the distribution plate 110, c) a large number of motor plungers 123 angularly arranged to surround the motor shaft 121 and slidably fitted to the motor cylinders 122, and d) a motor swash plate 124 abutting against outer ends of these motor plungers 123. The back side of the motor swash plate 124 is supported in the housing 111 through a thrust bearing 125 in a state inclined by a specific angle to the motor shaft 121.

The right and left pump shafts 114, 114 are coupled coaxially through a joint 138 in the narrow portion 102a. On the other hand, right and left motor shafts 121, 121 are disposed so as to be rotatable relatively and coaxially.

Figure 12:
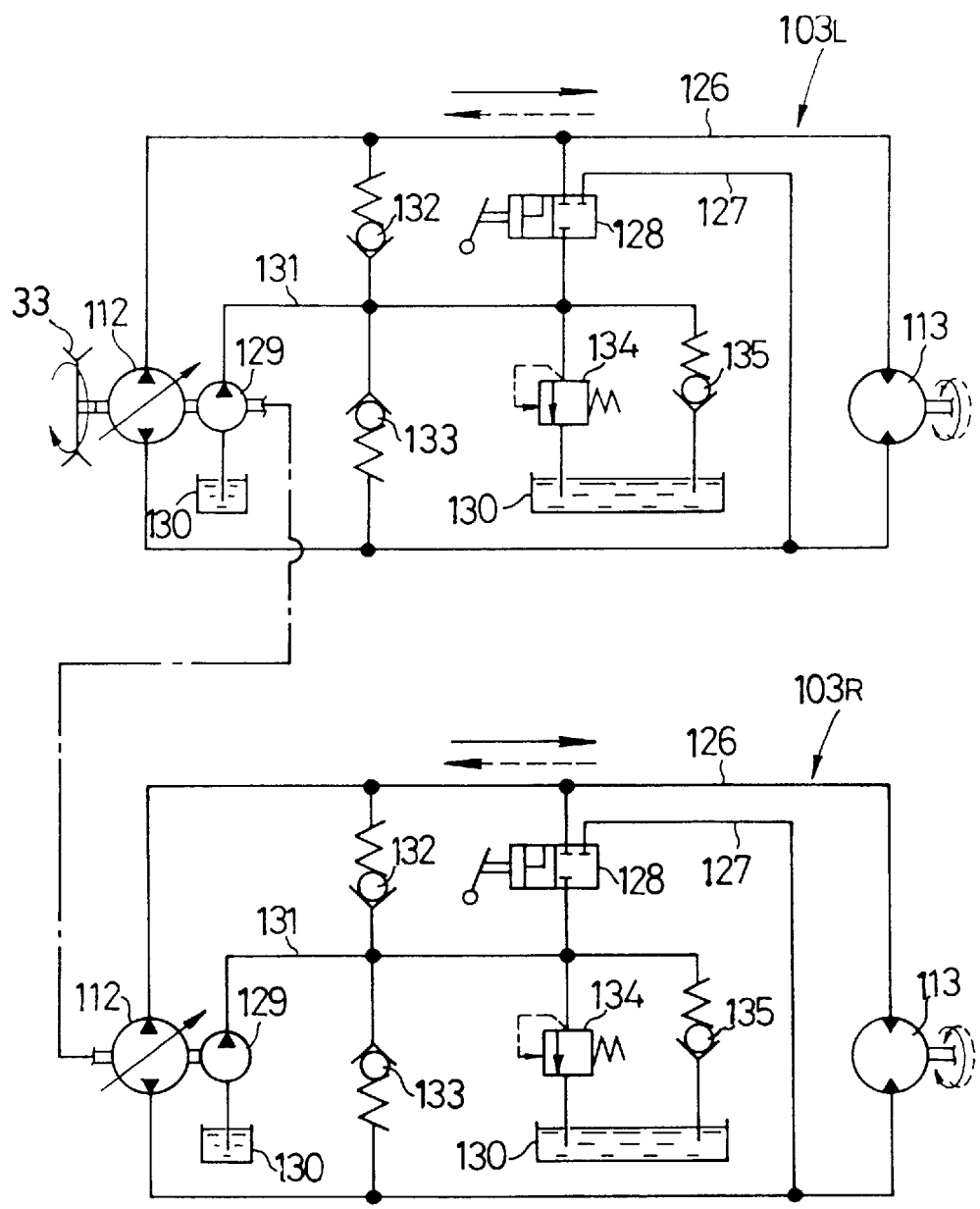
Figure 13:
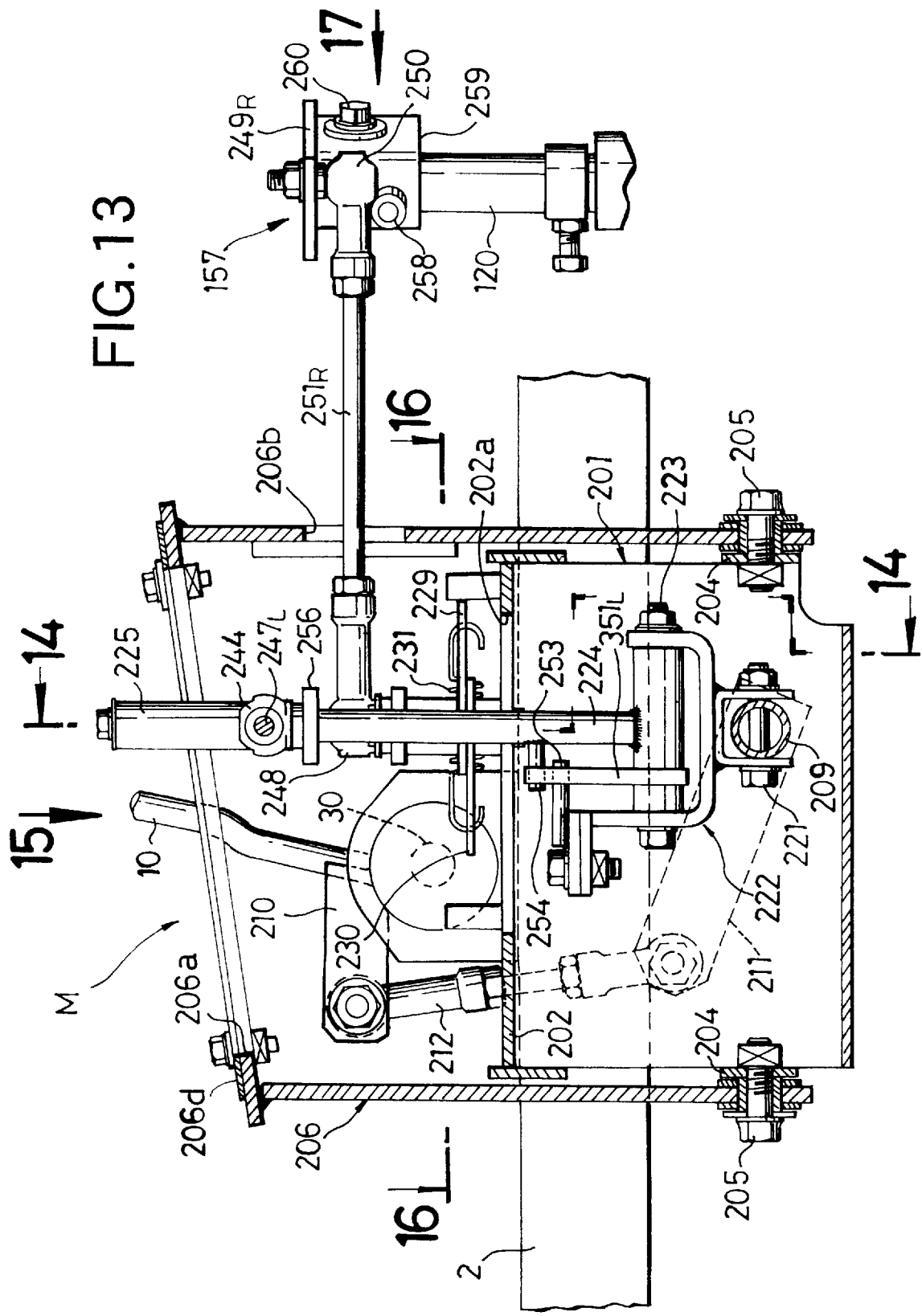
Figure 14:
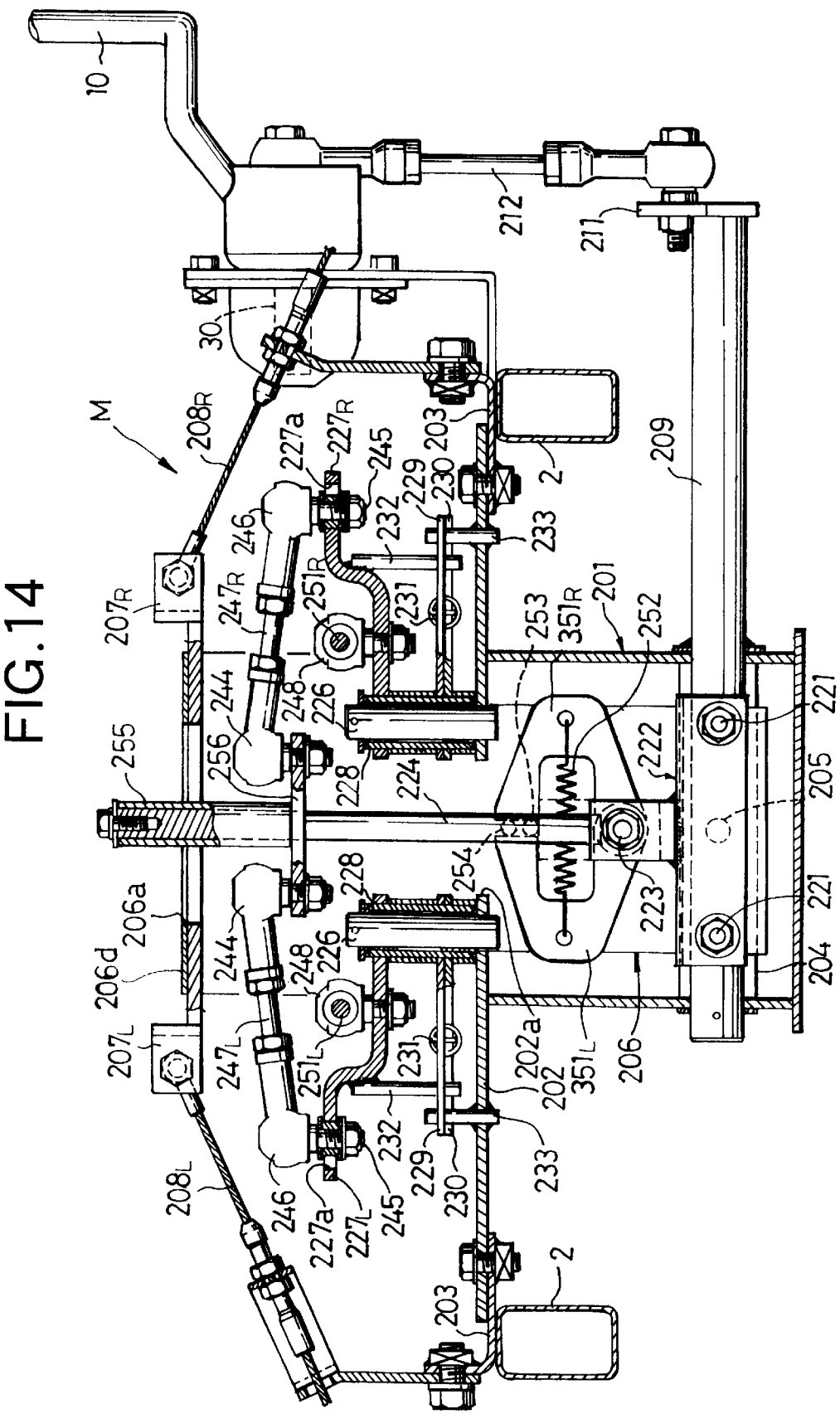
Figure 15:
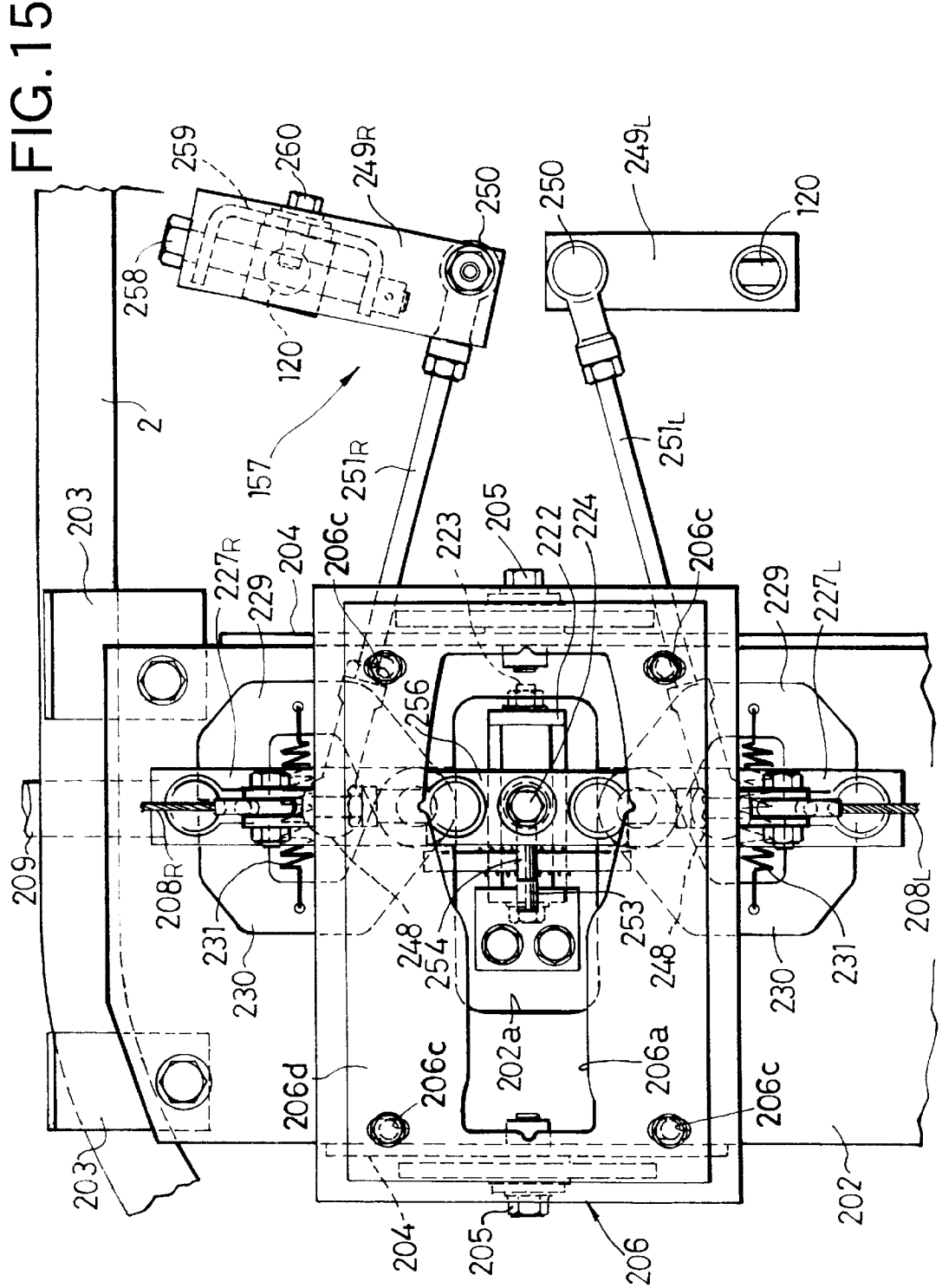
Figure 16:
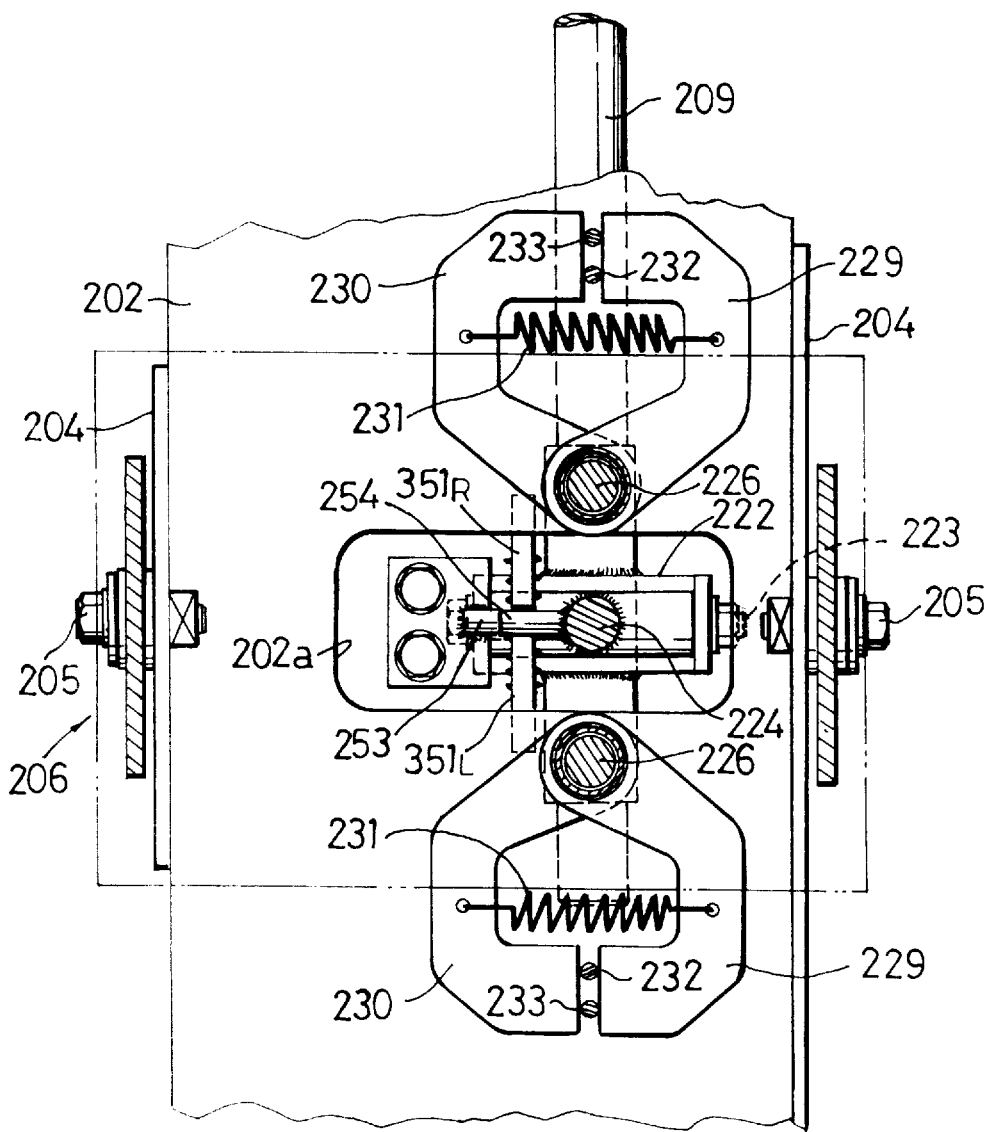
Figure 17:
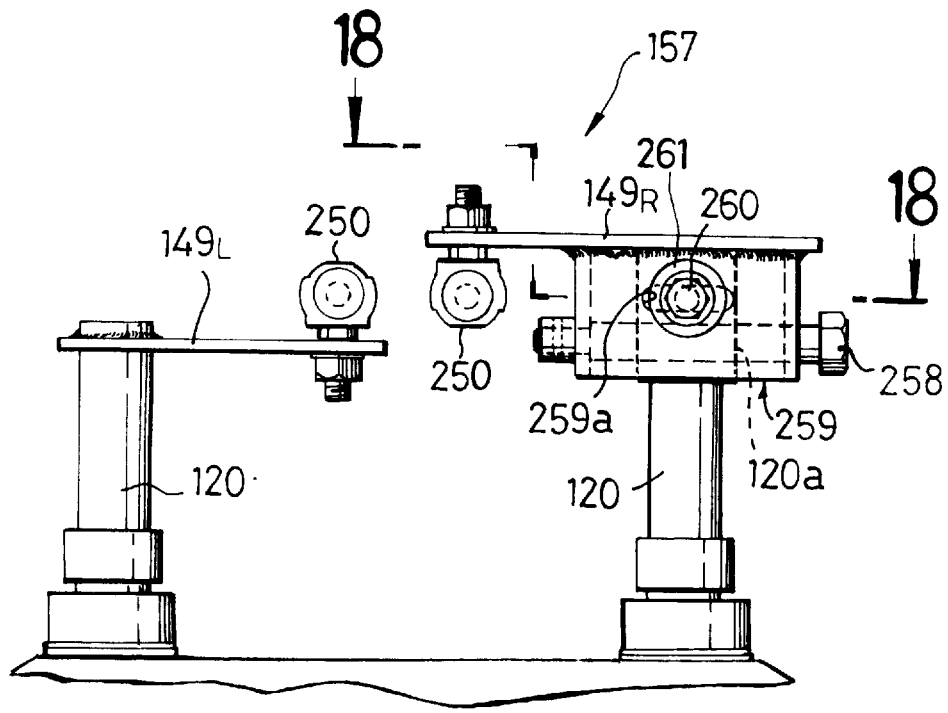
Figure 18:
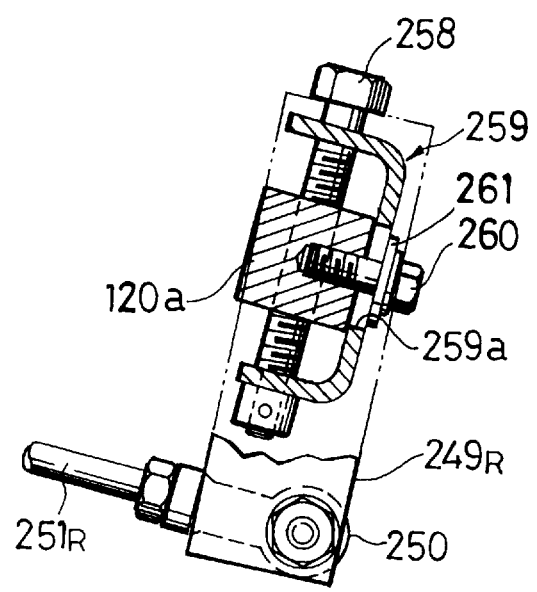

As shown in FIG. 12, in the hydrostatic continuously variable transmissions $103_R$, $103_L$, the hydraulic pump 112 and hydraulic motor 113 are mutually connected through a hydraulically closed circuit 126. In the hydraulically closed circuit 126, a bypass passage 127 is provided for connecting between a high pressure side and a low pressure side of the circuit 126. A release valve 128, opened and closed by manual operation, is interposed in the passage 127. The hydraulic pump 112 is connected to a working oil supply pump 129 driven by the pump shaft 114. The working oil supply pump 129 operates to pump up the working oil from an oil sump 130 to send it under pressure to an oil feed passage 131. The oil feed passage 131 is connected to the high pressure side and low pressure side of the hydraulically closed circuit 126 through one-way valves 132, 133, respectively. If necessary, the oil feed passage 131 may be connected to the oil sump 130 through relief valve 134 and suction valve 135 which are in mutual parallel relation.

When the release valve 128 is closed, if the hydraulic pump 112 is driven in a state where the pump swash plate 117 is inclined to the forward side, the working oil flows in the hydraulically closed circuit 126 in the direction of a solid line arrow. At that time, the motor shaft 121 of the hydraulic motor 113 rotates normally at the current ratio of the capacity of the hydraulic pump 112 and the capacity of the hydraulic motor 113 at this time as the speed change ratio. On the other hand, if the pump swash plate 117 is inclined to the reverse side, the working oil flows in the hydraulically closed circuit 126 in the direction of a broken line arrow, so that the motor shaft 121 rotates reversely. At that time, if an oil leak occurs in the hydraulically closed circuit 126, one of the one-way valves 132 and 133 which corresponds to the low pressure side at this time opens, and the working oil is supplied from the working oil supply pump 129 into the hydraulically closed circuit 126. If a pressure in the oil feed passage 131 is increased by a certain value, the relief valve 134 is opened so as to prevent the pressure in the oil feed passage 131 from excessively increasing. When the high pressure side and low pressure side are suddenly inverted in the hydraulically closed circuit 126 due to an engine brake, if a supply of working oil to the low pressure side from the working oil supply pump 129 is insufficient, the suction valve 135 is opened, and the oil in the oil sump 130 is sucked into the low pressure side, thereby preventing air suction by the hydraulically closed circuit 126.

In FIG. 9, the oil sump 130 is defined between both the case halves $102_R$, $102_L$ of the transmission case 102. Inside each distribution plate 110, there is disposed an oil filter 136 immersed in the oil sump 130 through each suction portion of the working oil supply pump 129 and suction valve 135. The working oil to be supplied into the working oil supply pump 129 and suction valve 135 is thus filtered.

Figure 10:
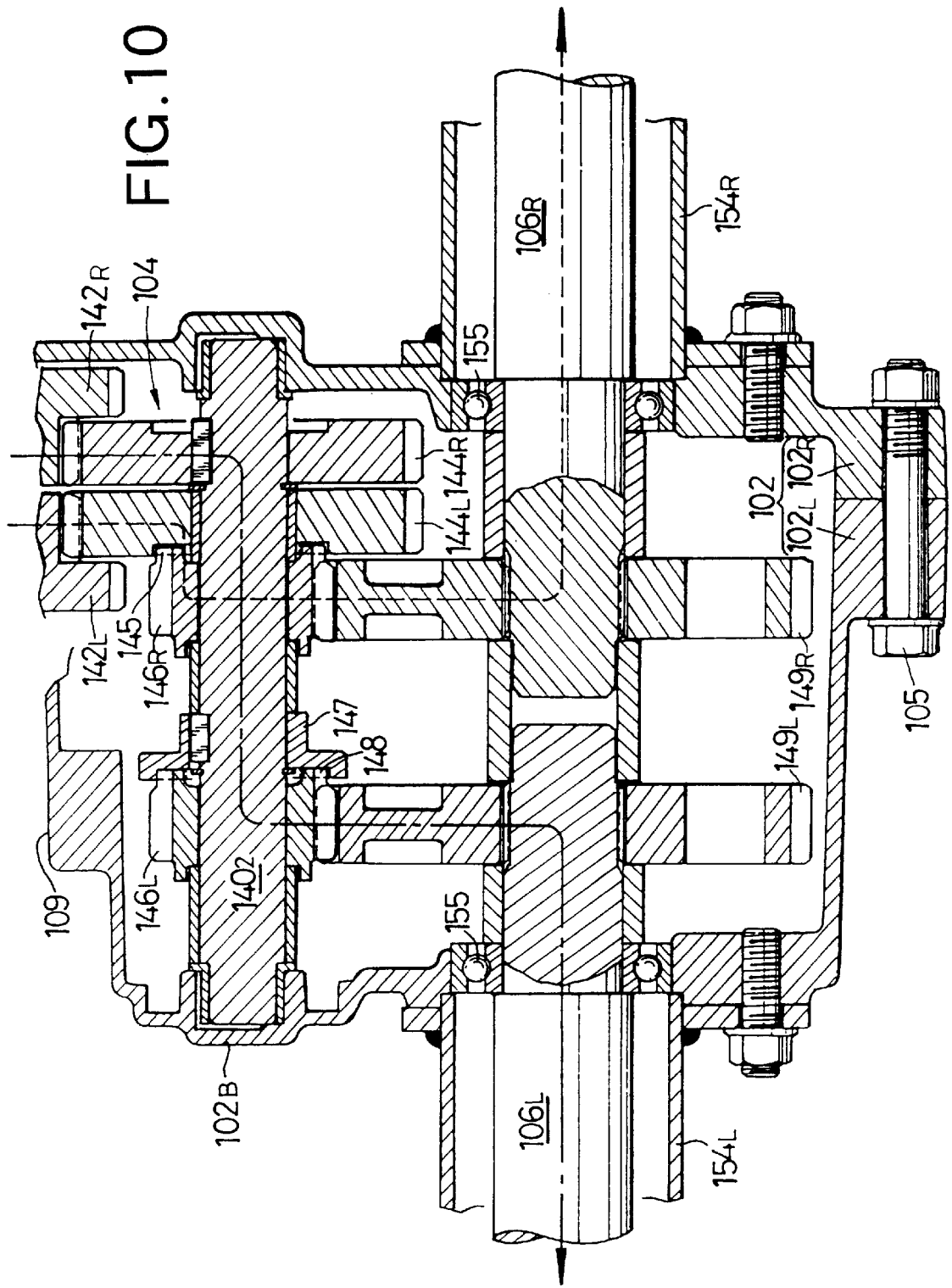

As shown in FIGS. 9 and 10, the speed reduction device 104 includes a) first and second intermediate shafts $140_1$, $140_2$ rotatably supported, in parallel to the axles $106_R$, $106_L$, on the narrow portion $102_A$ and wide portion $102_B$ of the transmission case 102, respectively, b) a pair of right and left first small gears $141_R$, $141_L$ secured to the inner ends of the right and left motors 121, 121, respectively, c) a pair of right and left first large gears $142_R$, $142_L$ engaged with the first gears $141_R$, $141_L$ and rotatably supported on the first intermediate shaft $140_1$, d) a pair of right and left second small gears $143_R$, $143_L$ formed integrally with opposed ends of the first large gears $142_R$, $142_L$, respectively, e) a right second large gear $144_R$ engaged with the right second gear $143_R$ and coupled by key or spline to the right end of the second intermediate shaft $140_2$ facing the narrow portion $102_A$ of the second intermediate shaft, f) a left second large gear $144_L$ engaged with the left second gear $143_L$ and rotatably supported on the second intermediate shaft $140_2$ adjacent to the left side of the right second large gear $144_R$, g) a right final gear $146_R$ rotatably supported on the second intermediate shaft $140_2$ and coupled to the left end of the left second large gear $144_L$ through a dog clutch 145, h) a clutch body 147 coupled by key or spline with the second intermediate shaft $140_2$ at the left side of the right final gear $146_R$, i) a left final gear $146_L$ rotatably supported on the second intermediate shaft $140_2$ and coupled to the left end of the clutch body 147 through a dog clutch 148, and j) a pair of right and left final large gears $149_R$, $149_L$ spline coupled with the right and left axles $106_R$, $106_L$ and engaged with the right and left final gears $146_R$, $146_L$, respectively. The driving force of the right side hydraulic motor 113 is transmitted to the left side axle $106_L$, and the driving force of the left side hydraulic motor 113 is transmitted to the right side axle $106_R$.

Figure 11:
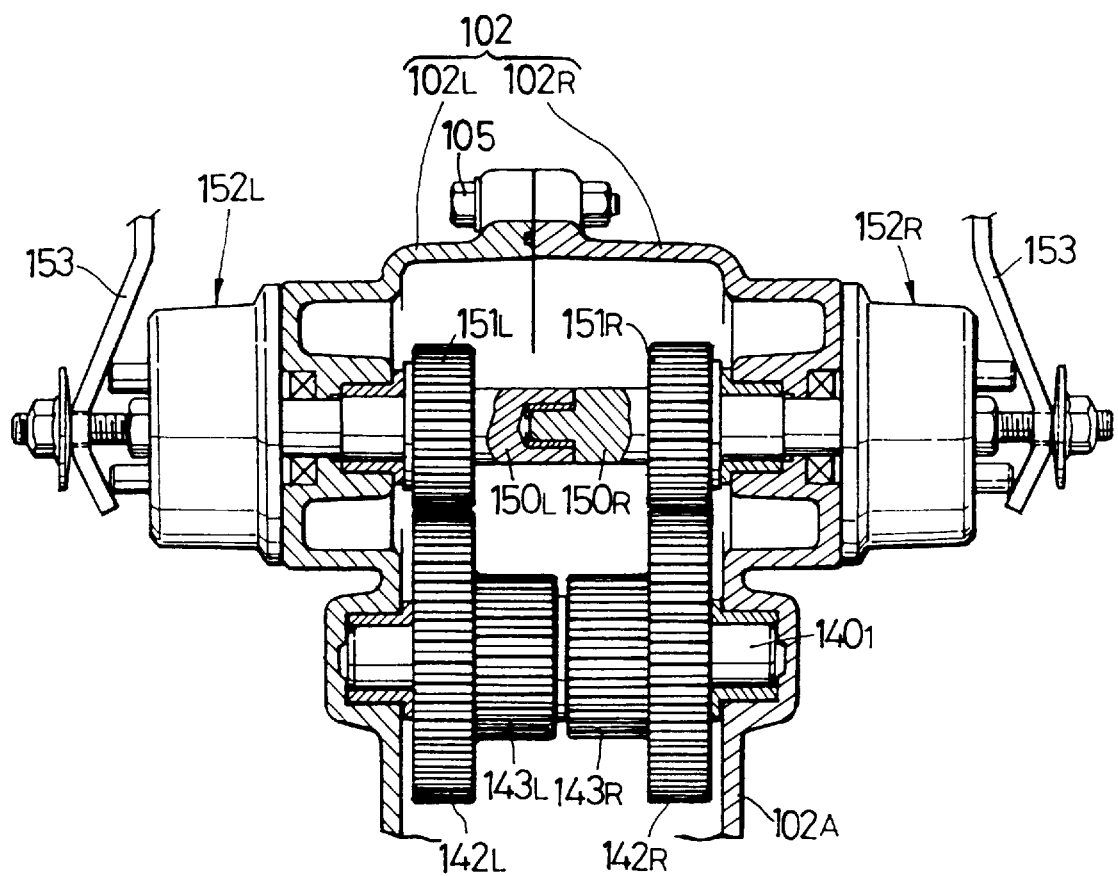

As shown in FIGS. 7 and 11, in the narrow portion $102_A$ of the transmission case 102, a pair of right and left brake shafts $150_R$, $150_L$, parallel to the first intermediate shaft $140_1$ and coaxial with each other, are relatively rotatably supported. These brake shafts $150_R$, $150_L$ are secured with a pair of brake gears $151_R$, $151_L$ to be engaged with the first large gears $142_R$, $142_L$ respectively. The right and left brake shaft $150_R$, $150_L$ are projected to the right and left sides of the narrow portion $102_A$, and are respectively provided with brake devices $152_R$, $152_L$ operated by a tension of a brake lever 153.

Instead of engaging gears $151_R$, $151_L$ with the first large gears $142_R$, $142_L$, the brake gears $151_R$, $151_L$ may be engaged with the second gears $144_R$, $144_L$.

As shown in FIGS. 4 and 6, one of the pump shafts 114 projects outward from the front part of the left case half $102_L$. An endless belt 34 is wound between a transmission drive pulley 32, provided on the crankshaft 11 of the engine E, and a transmission driven pulley 33 provided on the one pump shaft 114. A tension pulley 38 is provided at a tip end of a tension pulley support arm 37 which is pivoted on a pivot 35 and biased by a spring 36. The tension pulley 38 abuts against the endless belt 34 to generate a predetermined tension.

In this way, the driving force of the engine E is distributed to the pump shafts 114, 114 of the right and left hydrostatic continuously variable transmissions $103_R$, $103_L$ through the transmission drive pulley 32, the endless belt 34, and the transmission driven pulley 33, and such distributed driving forces are properly changed in speeds, and then, output to the speed reduction device 104 through corresponding motor shafts 121, 121. The driving force output to the speed reduction device 104 from the motor shaft 121 of the right side hydrostatic continuously variable transmission $103_R$ is transmitted to the left side axle $106_L$, whereas the driving force output to the speed reduction device 104 from the motor shaft 121 of the left side hydrostatic continuously variable transmission $103_L$ is transmitted to the right side axle $106_R$, so that the right and left rear wheels Wr are driven to move the working vehicle 1.

In this case, in the right and left hydrostatic continuously variable transmissions $103_R$, $103_L$, if both the pump swash plates 117, 117 are tilted to the forward side, both motor shafts 121, 121 rotate normally, and the working vehicle 1 runs forward. If both the pump swash plates 117, 117 are tilted to the reverse side, both the motor shafts 121, 121 rotate reversely, and the working vehicle 1 can travel backward. Moreover, by varying the speed change ratio of the right and left hydrostatic continuously variable transmissions $103_R$, $103_L$ such that the tilting angles of the right and left pump swash plates 117, 117 become different from each other, a difference is caused in the rotating speeds of the right and left motor shafts 121, 121, so that the working vehicle 1 can turn.

The rotating speed of the engine E is variable, but it is fixed at 3600 RPM in an ordinary operating state.

Relating to FIGS. 1 to 6, the transmission of power from the engine E to the rotary utility machine R is described below.

A utility machine-lifting/lowering shaft 62, extending in a lateral direction of the vehicle body, is rotatably supported on a bracket 61 projecting rearward from the rear-most cross frame $3_5$. A utility machine drive pulley 63, provided on the crankshaft 11 of the engine E, and a utility machine driven pulley 64, provided on the utility machine-lifting/lowering shaft 62, are connected through an endless belt 65. A tension clutch C, for controlling the tension of the endless belt 65, is connected to the clutch lever 9 which is pivoted to the vehicle body front portion swingably in the longitudinal direction through a pivot 66.

That is, a transmission shaft 68, extending in the vertical direction, is rotatably supported on a bracket 67 provided on the left side frame 2. An arm 69 secured to this transmission shaft 68 is connected to the lower end of the clutch lever 9 through a link 70. A tension pulley 73, provided at one end of an L-shaped support arm 72 having the intermediate portion pivoted through a pivot 71, abuts against the endless belt 65. The other end of the support arm 72 is connected to another arm 60 secured to the transmission shaft 68 by means of Bowden wire 75 having a buffer spring 74 incorporated therein. The transmission shaft 68 is biased in the counterclockwise direction in FIG. 6 (that is, an OFF direction of tension clutch C) by a return spring 76.

When the clutch lever 9 is pushed forward to turn on the tension clutch C, the transmission shaft 68 is turned in the clockwise direction, from the OFF position to the ON position, against the return spring 76 to pull the Bowden wire 75, and the support arm 72 oscillates, so that the tension pulley 73 is pushed against the endless belt 65. In this way, the tension clutch C is turned on, and the rotation of the crankshaft 11 of the engine E is transmitted to the utility machine-lifting/lowering shaft 62. When the transmission shaft 68 turns from the OFF position to the ON position, it passes the neutral point, and therefore the transmission shaft 68 is stably held at the ON position by the tension of the buffer spring 74 through the Bowden wire 75. When the clutch lever 9 is pulled back to turn off the tension clutch C, the transmission shaft 68 is turned to the OFF position by the elastic force of the return spring 76, and is stably held there.

A rear chain case 79 is coupled through an intermediate case 78 to the rear end of a front chain case 77 pivoted on the utility machine-lifting/lowering shaft 62 so as to be vertically swingable. The rotary utility machine R, including the front chain case 77, intermediate case 78 and rear chain case 79, is driven vertically by a utility machine elevating cylinder 80 attached to the bracket 61. That is, a first bracket 85 and a second bracket 86 are pivoted on the utility machine-lifting/lowering shaft 62 so as to be vertically swingable. The first bracket 85 is coupled with the rear chain case 79 through a coupling member 87. The second bracket 86 is connected to the utility machine elevating cylinder 80. The second bracket 86 is opposed to the lower side of the first bracket 85. When the second bracket 86 is swung vertically by the utility machine elevating cylinder 80, the first bracket 85, pressed by the second bracket 86, oscillates upward together with the rotary utility machine R. If the utility machine elevating cylinder 80 does not operate, the rotary utility machine R can freely oscillate upward about the utility machine-lifting/lowering shaft 62 by the reaction from the ground.

A plurality of tilling blades 81, provided at the rear end of the rear chain case 79, are connected to the utility machine-lifting/lowering shaft 62 by a chain transmission mechanism (not shown) accommodated in the front chain case 77, intermediate chain case 78, and rear chain case 79 and are driven for rotation. Reference numeral 82 in the drawing denotes a cover for the tilling blades 81, 83 is a resistance rod, and 84 is a leveling plate.

Next, referring to FIGS. 13 to 18, the structure of a transmission operating device M will be provided. The transmission operating device M mixes the operations of the steering wheel 8 and the change lever 10 so as to move the utility vehicle 1 back and forth and turn it left and right.

The transmission operating device M includes a base member 201. The base member 201 has left and right opposite walls as well as a bottom wall, and its upper surface is opened. The base member 201 has a C-shaped cross section. A supporting plate 202 is connected to an upper end of the base member 201, and is supported on the side frames 2, 2 through two left stays 203 and two right stays 203. A guide member 206, having a reversed U-shape when viewed from the side, is pivotally supported for laterally swinging movements at its front and rear lower ends on a pair of brackets 204, 204 welded to front and rear portions of the base member 201 through longitudinally extended pivots 205, 205.

Bowden wires $208_L$, $208_R$ are connected at their one ends to a pair of wire joints $207_L$, $207_R$ provided at an upper end of the guide member 206. The other ends of the Bowden wires $208_L$, $208_R$ are connected to a sector gear 24 (See FIG. 5) which is turned by the steering wheel 8. Therefore, if the steering wheel is operated to turn the utility vehicle 1, the guide member 206 is laterally swung around the pivots 205, 205 through the Bowden wires $208_L$, $208_R$.

A laterally extended rotary shaft 209 is rotatably supported at a lower portion of the base member 201. An arm 210, secured to the pivot shaft 30 of the change lever 10, and an arm 211, secured to a right end of the rotary shaft 209, are connected with each other through a rod 212. The rotary shaft 209 is turned by swinging the change lever 10 longitudinally.

A bracket 222 is secured to the rotary shaft 209 by two bolts 221, 221. A mixing lever 224 is pivotally supported at its lower end by the bracket 222 through a pivot pin 223, such that the mixing lever 224 can swing laterally. The mixing lever 224 passes through an opening 202*a* of the supporting plate 202 to extend upward. A pair of left and right neutral plates $351_L$, $351_R$ (see FIG. 14) are pivotally supported by the pivot pin 223 such that the neutral plates $351_L$, $351_R$ can swing independently from each other. The neutral plates $351_L$, $351_R$ are biased toward each other by a neutral spring 252. The left and right neutral plates $351_L$, $351_R$ are stopped at positions where the neutral plates abut against a stationary neutral pin 253 provided at an upper end of the bracket 222.

A movable neutral pin 254, provided on the mixing lever 224, is clamped between the neutral plates $351_L$, $351_R$, thereby stably stopping the mixing lever 224 in the neutral position. If the mixing lever 224 is turned leftward, the left neutral plate $351_L$, which is pushed by the movable neutral pin 254, is swung leftward while extending the neutral spring 252. If the mixing lever 224 is turned rightward, the right neutral plate $351_R$ which is pushed by the movable neutral pin 254 is swung rightward while extending the neutral spring 252.

A guide plate 206*d* is secured on an upper surface of the guide member 206 by a bolt and a nut, and is formed with a guide groove 206*a* which is elongated in a longitudinal direction. The mixing lever 224 is loosely received in the guide groove 206*a*. A position of the guide plate 206 can be adjusted in a lateral direction along elongated holes 206*c* formed in the guide member 206, and a lateral turning characteristic of the vehicle can be uniformalized by such an adjustment of the position.

Therefore, if the change lever 10 is operated to turn the rotary shaft 209 longitudinally, the mixing lever 224 is swung longitudinally along the guide groove 206*a*. If the steering wheel 8 is operated to laterally swing the guide member 206 around the pivots 205, 205, a guide roller 255, which is rotatably supported around an upper outer periphery of the mixing lever 224, abuts against left and right opposite edges of the guide groove 206*a* and is pushed, so that the mixing lever 224 is laterally swung around the pivot pin 223. At that time, the mixing lever 224 does not swing when the steering wheel 8 angle is small due to a clearance formed between the mixing lever 224 and the opposite edges of the guide groove 206a. When the steering angle exceeds a predetermined value, the edges abut against the guide roller 255, and the mixing lever 224 starts swinging.

As is apparent in FIG. 20, the guide groove 206a is formed into a gourd shape or a shape similiar to a pin used in the game of bowling. A width of the guide groove 206a in a lateral direction is set such that a portion of the guide groove 206a corresponding to the position a of the mixing lever 224 (vehicle speed V=0 km/hr) is the widest, and from there, the width is gradually reduced toward a portion corresponding to the position b of the mixing lever 224 (vehicle speed V=2.5 km/hr), and from there, the width is kept substantially constant toward the position c of the mixing lever (vehicle speed V=5.2 km/hr). Further, the width of the guide groove 206a is gradually reduced from a portion corresponding to the position a of the mixing lever (vehicle speed V=0 km/hr) toward a portion corresponding to the position d (vehicle speed V=-2.5 km/hr).

Base ends of a pair of left and right control arm $227_L$, $227_R$ are supported for longitudinally swinging movement by a pair of left and right pivot shafts 226, 226 which are embedded on an upper surface of the supporting plate 202. Upper and lower neutral plates 229, 230 are pivotally supported by each of the pivot shaft 226, and are biased by a neutral spring 231 toward each other. A neutral pin 232, downwardly secured to each of the control arms $227_L$, $227_R$, and a neutral pin 233, upwardly secured to the supporting plate 202, are clamped between both the neutral plates 229 and 230. Therefore, the control arms $227_L$, $227_R$ are biased toward a neutral position, i.e., a position in which the control arms $227_L$, $227_R$ extend straight in a lateral direction.

Inner ball joints 244, 244 are provided at left and right opposite ends of a bracket 256 secured to the mixing lever 224. The control arms $227_L$, $227_R$ are formed at their tip ends with elongated holes 227a, 227a extended in a longitudinal direction of the control arms $227_L$, $227_R$. Outer ball joints 246, 246 are slidably supported in the elongated holes 227a, 227a through bolts 245, 245. The inner ball joints 244, 244 and the outer ball joints 246, 246 are interconnected by a pair of push-pull rods $247_L$, $247_R$ whose lengths can be adjusted in a turnbuckle manner. When the mixing lever 224 is in a vertical neutral position (a position a in FIG. 20), the push-pull rods $247_L$, $247_R$ are linearly superposed on the control arms $227_L$, $227_R$, as viewed from above.

The left and right control arms $227_L$, $227_R$ are provided at their intermediate portions with a pair of front ball joints 248, 248. The transmission T includes a pair of swash plate shafts 120, 120 which are provided at their upper ends with the transmission arms $249_L$, $249_R$. The transmission arms $249_L$, $249_R$ are provided at their tip ends with a pair of rear ball joints 250, 250. The front ball joints 248, 248 and the rear ball joints 250, 250 are interconnected by a pair of push-pull rods $251_L$, $251_R$ whose lengths can be adjusted in a turnbuckle manner. In order to avoid interference with the push-pull rods $251_L$, $251_R$, an opening 206b is formed in a rear surface of the guide member 206. Therefore, if the change lever 10 and the steering wheel 8 are operated, the transmission arms $249_L$, $249_R$ of the transmission T are swung in association with swinging movements of the control arms $227_L$, $227_R$ of the transmission operating device M, and the number of rotations of the left and right rear wheels Wr, Wr are increased or decreased.

Next, a structure of a pump volume-fine adjusting mechanism 157 will be explained with reference to FIGS. 13, 15, 17 and 18.

The pump volume-fine adjusting mechanism 157 is for adjusting the volume of the hydraulic pumps 112, 112 of the left and right hydrostatic continuously variable transmissions $103_L$, $103_R$ when the steering wheel 8 is kept in the neutral position to move the utility vehicle 1 straight backward or forward, thereby eliminating an error in output rotational numbers of both the hydrostatic continuously variable transmissions $103_L$, $103_R$ so as to compensate the unintentional turning tendency of the utility vehicle 1. The pump volume-fine adjusting mechanism 157 includes the push-pull rods $251_L$, $251_R$ whose lengths can be adjusted in a turnbuckle manner. By adjusting the lengths of the push-pull rods $251_L$, $251_R$, it is possible to adjust each of the output rotational numbers of the left and right hydrostatic continuously variable transmissions $103_L$, $103_R$ to zero.

The length of the right transmission arm $249_R$ can be adjusted such that the rate of changes of the hydrostatic continuously variable transmissions $103_L$, $103_R$ homologize with each other. More specifically, an adjust bolt 258 is threadedly engaged to pass through an angled shaft portion 120a of the swash plate shaft 120 of the right hydrostatic continuously variable transmissions $103_R$. A U-shaped follower member 259 is slidably locked to the adjust bolt 258. The follower member 259 is slidably contacted with a side of the angled shaft portion 120a, and is formed at its intermediate portion with an elongated hole 259a which is in parallel to the adjust bolt 258. A locking bolt 260, passing through the elongated hole 259a, is threadedly inserted into one side of the angled shaft portion 120a through a flush washer 261. The transmission arm $249_R$ is integrally secured to an upper surface of the follower member 259.

If the adjust bolt 258 is rotated in a state where the locking bolt 258 is lightly loosen, the follower member 259 is moved along the elongated hole 259a along with the adjust bolt 258, and the arm length of the transmission arm 249 is varied. When a predetermined or desired length is obtained, the transmission arm $249_R$ is secured to the swash plate shaft 120 by tightening the locking bolt 260.

If the arm length of the transmission arm $249_R$ is shortened, the rate of changes in the output rotational numbers of the hydrostatic continuously variable transmission $103_R$ is decreased. Therefore, by appropriately adjusting the arm length, it is possible to homologize the output rotational numbers of both the left and right hydrostatic continuously variable transmissions $103_L$ and $103_R$, and to move the utility vehicle 1 straight irrespective of the running speed.

The operation of the embodiment of the invention having such a constitution is described below.

Hereinafter, the term "an inner wheel" is defined as a vehicle wheel which is on an inner side of the vehicle during turning of the vehicle, and the term "outer wheel" is defined as a wheel which is on an outer side of the vehicle during turning of the vehicle.

When the right and left control arms $227_R$, $227_L$ are both moved forward from the neutral position, the rotating speed in the normal rotating direction of the right and left hydrostatic continuously variable transmissions $103_R$, $103_L$ increases, and the working vehicle 1 runs or travels forward at a vehicle speed of 0 km/h to +5.2 km/h. When the right and left control arms $227_R$, $227_L$ are both moved backward from the neutral position, the rotating speed in the reverse rotating direction of the right and left hydrostatic continuously variable transmissions $103_R$, $103_L$ increases, and the working vehicle 1 runs or travels backward at a vehicle speed of 0 km/h to -2.4 km/h. When the working vehicle 1 turns, a difference is caused in the moving angle of the right and left control arms $227_R$, $227_L$ from the neutral position, and the outer driving wheel speed Vo is increased, and the inner driving wheel speed Vi is decreased. As a result, along with turning of the front wheel Wf by operation of the steering wheel 8, the working vehicle 1 is turned. Alternatively, by driving only the outer wheel and stopping the driving of the inner wheel of the driven wheels during turning, the working vehicle 1 can make a stationary swing.

The relationship between the behavior of the utility vehicle 1 and the operations of the steering wheel and the change lever 10, is discussed below with reference to FIGS. 19(A)–(D) and 20.

When the change lever 10 is in its neutral position, the utility vehicle 1 is stopped. At that time, the left and right push-pull rods $247_L$, $247_R$ are superposed on upper portions of the left and right control arms $227_L$, $227_R$ which are extended straight in left and right directions (see position a in FIGS. 19C and 20). In such a state, if the steering wheel 8 is operation, e.g., in left direction, the guide member 206 starts swinging rightwardly around the pivot 205, 205. Even if the steering wheel is turned to the limit, a left edge of the guide groove 206a of the guide member 206 does not abut against the mixing lever 224.

If the change lever 10 is swung forwardly from the neutral position, the rotation shaft 209 connected to the change lever 10 is turned forwardly, and the mixing lever 224 connected to the change lever 10 is also turned forwardly. As a result, the inner balls joints 244, 244 provided on the upper portion of the mixing lever 224 move forwardly, and the outer ball joints 246, 246 connected to the inner ball joints 244, 244 through the push-pull rods $247_L$ $247_R$ are pulled forwardly and inwardly.

Figure 19A:
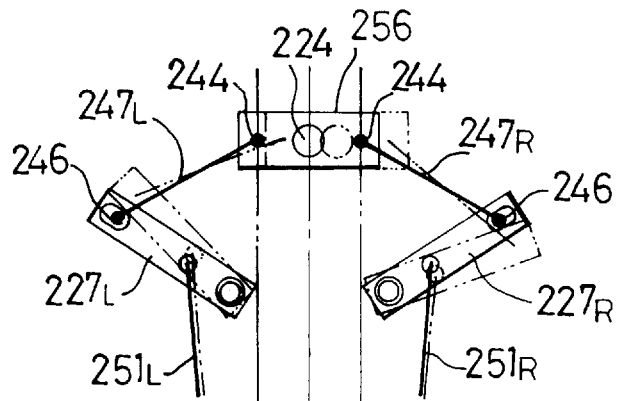
FIGS. 19(A)–19(D) are illustrations for explaining the operation of the present invention.
Figure 19B:
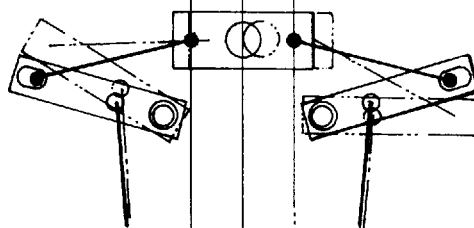
Figure 19C:
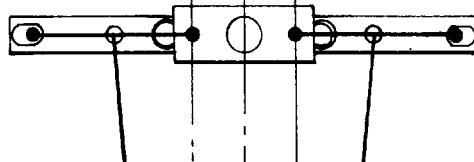

As a result, the left and right control arms $227_L$, $227_R$ whose elongated holes 227a, 227a are pulled at their inner end by the bolts 245, 245 of the outer ball joints 246, 246 are swung forwardly through the same angle against the neutral spring 231, 231 (see position c in FIGS. 19B, 19A and FIG. 20). If the left and right control arms $227_L$, $227_R$ swing forwardly through the same angle, the utility vehicle 1 runs or travels forwardly at a speed corresponding to the amount of such swing movements (0 km/hr to +5.2 km/hr).

At that time, if the steering wheel 8 is turned, for example, leftward and the turning angle θ reaches a predetermined value, a left edge of the guide groove 206a of the guide member 206 which swung rightward abuts against the mixing lever 224 (positions b' and c' in FIG. 20), and the mixing lever 224 swings rightward. As a result, as shown by a dashed line in FIGS. 19B and 19A, the left and right push-pull rods $247_L$, $247_R$ move rightward, and the swinging angle of the left control arm 227, which is toward the front of the left control arm $227_L$, increases to the position shown by the dashed line, and the swinging angle of the right control arm $227_R$, which is toward the front of the right control arm $227_R$, decreases to the position shown by the dashed line. With such movements, the number of rotations of the motor shaft 121 of the left hydrostatic continuously variable transmission $103_L$ is increased in order to increase the speed of the right rear wheel Wr, and the number of rotations of the motor shaft 121 of the right hydrostatic continuously variable transmission $103_L$ is decreased to decrease the speed of the left rear wheel Wr or to stop the rear wheel Wr.

Figure 19D:
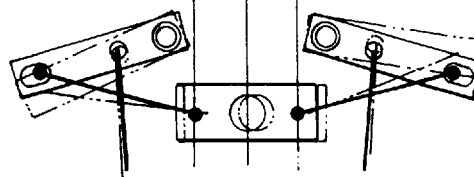

When the change lever 10 is moved rearward from the neutral position, the right and left control arms $227_R$, $227_L$ move rearward symmetrically as in forward running, and the working vehicle 1 runs or travel backward at a vehicle speed (for example, −2.4 km/h) corresponding to the reverse moving extend of the control arms $227_R$, $227_L$ (see position d in FIGS. 19D and 20).

In the case of backward traveling, if the steering wheel 8 is turned, for example, leftward and the turning angle θ reaches a predetermined value, the left edge of the guide groove 206a of the guide member 206 abuts against the mixing lever 224 (positions d' in FIG. 20), and the mixing lever 224 swings rightward. As a result, as shown by a dashed line in FIGS. 19D, the left and right push-pull rods $247_L$, $247_R$ move rightward, and the swinging angle of the left control arm $227_L$, which is toward the back of the left control arm $227_L$, increases to the position shown by the dashed line, and the swinging angle of the right control arm $227_R$, which is toward the back of the right control arm $227_R$, decreases to the position shown by the dashed line. With such movements, the number of rotations of the motor shaft 121 of the left hydrostatic continuously variable transmission $103_L$ is increased to increase the speed of the right rear wheel Wr, and the number of rotations of the motor shaft 121 of the right hydrostatic continuously variable transmission $103_L$ is decreased to decrease the speed of the left rear wheel Wr or to stop the rear wheel Wr.

The operation of the steering wheel 8 in a leftward direction has been described above, but the effect when the steering wheel 8 is operated in a rightward direction is substantially the same.

As described above, it is possible to control the transmission T by mixing the operations of the steering wheel 8 and the change lever 10. Further, even if only one of the steering wheel 8 and the change lever 10 is operated, the operation does not interfere with each other, and it is possible to simplify the operation of the vehicle by an operator and thus, to alleviate fatigue of the operator of the vehicle.

The above described effect will be described in more detail with reference to graphs shown in FIGS. 21 and 22.

Figure 21:
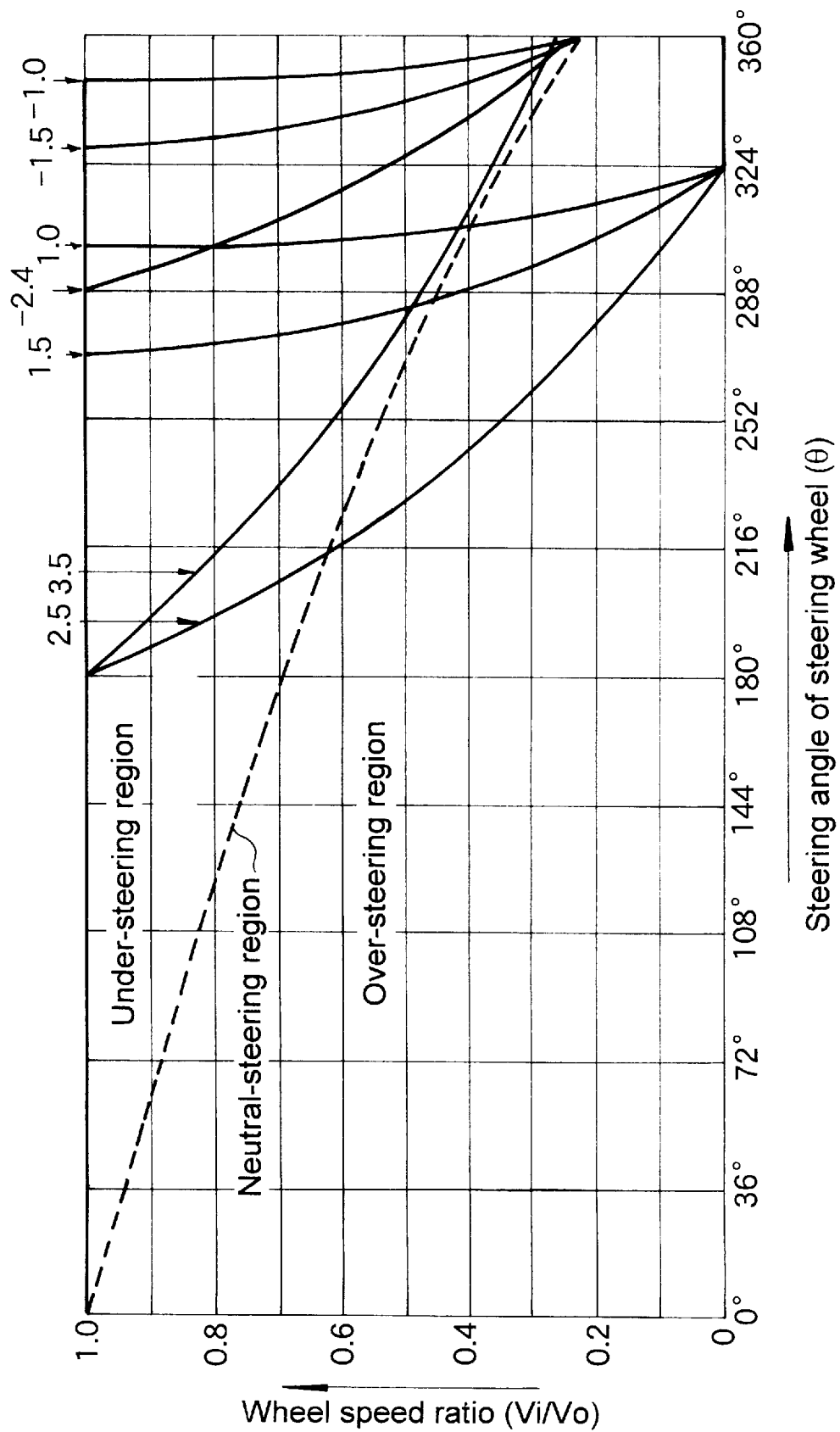

In FIG. 21, the abscissas denotes the turning angle θ (0° to 360°), and the ordinate denotes the vehicle wheel speed ratio (inner wheel speed Vi/outer wheel speed Vo, during turning of the vehicle). A broken line indicates a neutral line (either of the inner or outer wheels during turning of the vehicle does not slip).

For example, when the vehicle speed V is 0 km/hr, because a width of the guide groove 206a is a wide, the turning angle of the steering wheel is in a range of 0° to 300° and the vehicle wheel speed ratio Vi/Vo becomes 1.0. In such a case, the utility vehicle 1 is brought into a virtual differential lock state, and it is possible to blunt or dull a steering responsiveness at a low speed. When the turning angle θ of the steering wheel is equal to 308°, the steering characteristic is shifted from the under-steering state to the over-steering state by crossing a neutral-steering line from above to below. When the turning angle θ of the steering wheel is equal to 324°, the inner driving wheel speed Vi becomes 0 and the driving stage is shifted to stationary turning. After that, until the turning angle θ becomes 360°, the outer driving wheel Vo is increased while keeping the inner driving wheel speed at 0.

When the vehicle speed V is 1.5 km/hr, the condition is the same as that when the vehicle speed V is 1.0 km/hr. That is, in a region where the turning angle θ of the steering wheel is 0° to 270°, the is differential lock state is obtained; in a region where the turning angle θ of the steering wheel is 270° to 285°, the under-steering state is obtained; in a region where the turning angle e of the steering wheel is 285° to 324°, the over-steering state is obtained; and in a region where the turning angle θ of the steering wheel is 324° to 360°, a stationary turning state of the vehicle is obtained.

When the vehicle speed V=2.5 km/hr, in a region where the turning angle θ of the steering wheel is 0° to 180°, the under-steering state is obtained; in a region where the turning angle e of the steering wheel is 180° to 215°, the under-steering state is obtained; in a region where the turning angle θ of the steering wheel is 215° to 324°, the over-steering state is obtained; and in a region where the turning angle θ of the steering wheel is 324° to 360°, the stationary turning state is obtained. In order to make it possible to do a stationary turn of the utility vehicle 1 if the outer diameters of the rear wheels Wr, Wr are increased, the upper limit of the vehicle speed V is 3.0 km/hr. When the outer diameters of the rear wheels Wr, Wr are increased, the utility vehicle 1 can not do a stationary turn at a speed greater than 3.0 km/hr due to a relation with a link, even if the steering wheel is turn to the limit (i.e., even if the turning angle θ of the steering wheel=360°).

If variations of the outer diameters of the rear wheels Wr, Wr are taken into consideration, the driving state is shifted to the over-steering state in accordance with an increase of the turning angle θ of the steering wheel in a region where the vehicle speed V is in a range of 3.0 to 3.4 km/hr. However, at a speed greater than that range (FIG. 21 shows a case where the vehicle speed V=3.5 km/hr), even if the turning angle θ of the steering wheel is increased, the driving state is not shifted to the over-steering state.

When the utility is moving backward, the differential lock state is kept until the turning angle θ of the steering wheel approaches the limit (θ=360°), and the driving state is shifted to the under-steering state in the neighborhood of the limit turning angle of the steering wheel. Therefore, the driving state is not shifted to the over-steering state or the stationary turning state during running backward.

In this manner, when the utility vehicle 1 is traveling forward at a low speed (when working) in which the stability of the vehicle body is high, the turning performance can be enhanced by bringing the driving state into the ever-steering state or the stationary turning state with a relatively small turning angle θ of the steering wheel. Moreover, when the vehicle 1 is moving forward at a high speed (traveling on a road) or moving backward in which the stability of the vehicle body is low, it is possible to sufficiently secure the stability of the vehicle body by inhibiting the over-steering state and the stationary turning state.

Figure 22:
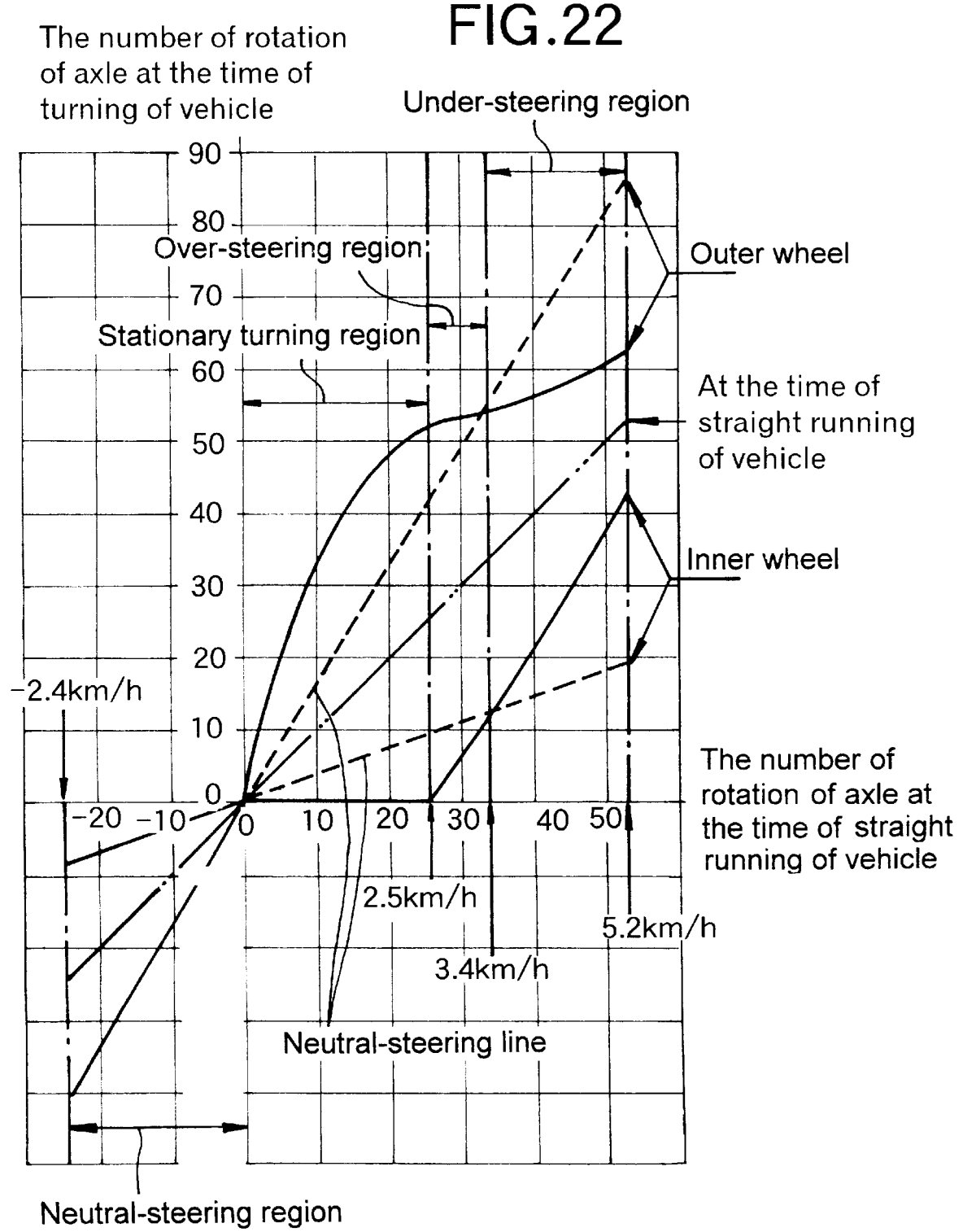

In FIG. 22, the abscissas denotes the number of rotations of the left and right axles during straight running of the vehicle, and the ordinate denotes the number of rotations of the inner driving wheel and the number of rotations of the outer driving wheel when the steering wheel is turned to the limit (θ=360°). In FIG. 22, the vehicle speed in brackets is a value when the outer diameters of the rear wheels Wr, Wr are increased to 1.15 times as described above.

At the time of forward movement of the utility vehicle 1, in the stationary turning region (in a first vehicle speed region) in which the vehicle speed V is in a range of 0 to 2.5 km/hr (o to 30. km/hr), the number of rotations of the inner driving wheel is zero, and the number of rotations of the outer driving wheel is increased 2 to 3 times as compared with during straight running. In the over-steering region (second and third regions of the vehicle speed) in which the vehicle speed V is in a range of 2.5 to 3.4 km/hr (3.0 to 3.9 km/hr), and in the under-steering region (third region of the vehicle speed) in which the vehicle speed V is in a range of 3.4 to 5.2 km/hr (3.9 to 60. km/hr), the number of rotations of the inner driving wheel is increased linearly, and the number of rotations of the outer driving wheel is increased non-linearly. At the time of backward movement of the utility vehicle, all the regions (the second region of the vehicle speed) in which the vehicle speed V is in a range of 0 to −2.4 km/hr (0 to −2.8 km/hr) becomes the neutral-steering region.

Instead of the four wheel vehicle shown in the embodiment, the present invention can also be applied to a tricycle having a single wheel to be steered, a four wheel vehicle in which front wheels Wf, Wf are driving wheels and rear wheels Wr, Wr are wheels to be steered, and a vehicle in which driving wheel is a crawler. In the vehicle having the crawler, the driving wheel speed corresponds to a speed of a wheel for driving the crawler.

Although the round steering wheel having a large rotational angle has been described in the embodiment, a steering bar having a small rotational angle may be used.

Further, although the transmission having two pumps and two motors is described in the embodiment, the present invention can be applied to a transmission having one pump and two motors. If the latter transmission is employed, a pump swash plate of a hydraulic pump may be controlled instead of controlling the motor swash plate of the hydraulic motor.

Furthermore, in the embodiment, although the hydrostatic continuously variable transmissions $103_L$, $103_R$ has been described as continuously variable transmissions, any type of continuously variable transmission such as belt-type continuously variable transmission, cone-type continuously variable transmission, frictional type continuously variable transmission and the like may be employed instead of the hydrostatic continuously variable transmissions $103_L$, $103_R$.

Although the embodiment of the present invention has been described in detail, it will be understood that the present invention is not limited to the above-described embodiment, and various modifications in design may be made without departing from the spirit and scope of the invention defined in claims.

What is claimed is:

1. A steering control device for a vehicle comprising:

a steering wheel;

a pair of hydrostatic continuously variable transmissions each having a hydraulic pump and a hydraulic motor;

left and right driven wheels connected to said pair of hydrostatic continuously variable transmissions and driven independently;

left and right wheels to be steered which are connected to said steering wheel; and a control means for controlling a transmission ratio of the pair of hydrostatic continuously variable transmissions in accordance with a steering angle of the steering wheel so as to turn the vehicle, wherein when the steering angle of said steering wheel becomes equal to or greater than a first predetermined steering angle of the steering wheel, said transmission ratio is controlled such that an inner wheel speed during turning of the vehicle is decreased and an outer wheel speed during turning of the vehicle is increased, wherein said first predetermined steering angle is one half of a limit steering angle.

2. A steering control device for a vehicle according to claim 1, wherein when the vehicle is turning at a speed within a first vehicle speed region which is a low vehicle speed region suitable for working, if said steering wheel angle becomes equal to or greater than a second predetermined steering angle adjacent to said limit steering angle, an inner wheel speed during turning of the vehicle becomes zero and a stationary turn of the vehicle is conducted.

3. A steering control device for a vehicle according to claim 2, wherein said first vehicle speed region is a region greater than 0 km/hr and equal to or smaller than 3.0 km/hr.

4. A steering control device for a vehicle according to claim 1, when the vehicle is turning at a speed within a second vehicle speed region, the inner wheel speed during turning of the vehicle is decreased in a range greater than 0 km/hr, wherein said second vehicle speed region is one of (1) a high vehicle speed region at forward traveling of the vehicle that exceeds a low vehicle speed region, and (2) an entire vehicle speed region at backward traveling of the vehicle.

5. A steering control device for a vehicle according to claim 4, wherein said second vehicle speed region includes a region smaller than 0 km/hr and a region greater than 3.0 km/hr.

6. A steering control device for a vehicle according to claim 1, wherein when the vehicle is turning at a speed within a high vehicle speed region at forward traveling of the vehicle that exceeds a low vehicle speed region, a steering characteristic is a neutral-steering state or an under-steering state.

7. A steering control device for a vehicle according to claim 1, wherein each of said hydraulic pumps has a swash plate shaft, and said swash plate shaft of the hydraulic pump of at least one of said pair of continuously variable transmissions is provided with a pump volume-fine adjusting mechanism for finely adjusting a discharge amount of oil.

8. A steering control device for a vehicle according to claim 7, wherein said pump volume-fine adjusting mechanism includes means for changing an arm length of a speed adjusting member provided on said swash plate shaft.

9. A steering control device for a vehicle comprising:
a steering wheel;
a pair of hydrostatic continuously variable transmissions each having a hydraulic pump and a hydraulic motor;
left and right driven wheels connected to said pair of hydrostatic continuously variable transmissions and driven independently;
left and right wheels to be steered which are connected to said steering wheel; and
a control means for controlling a transmission ratio of said pair of hydrostatic continuously variable transmissions in accordance with a steering angle of said steering wheel so as to turn the vehicle, wherein as the steering angle increases, an inner wheel speed during turning of the vehicle is decreased and an outer wheel speed during turning of the vehicle is increased, and when the steering angle approaches a limit steering angle, the inner wheel speed during turning of the vehicle becomes zero and a stationary turn of the vehicle is conducted.

10. A steering control device for a vehicle according to claim 9, wherein when the vehicle is turning at a speed within a first vehicle speed region which is a low vehicle speed region suitable for working, if said steering angle becomes equal to or greater than a second predetermined steering angle adjacent to said limit steering angle, the inner wheel speed during turning of the vehicle becomes zero and a stationary turn of the vehicle is conducted.

11. A steering control device for a vehicle according to claim 10, wherein said first vehicle speed region is a region greater than 0 km/hr and equal to or smaller than 3.0 km/hr.

12. A steering control device for a vehicle according to claim 9, when the vehicle is turning at a speed within a second vehicle speed region, the inner wheel speed during turning of the vehicle is decreased in a range greater than 0 km/hr, wherein said second vehicle speed region is one of (1) a high vehicle speed region at forward running of the vehicle that exceeds a low vehicle speed region, and (2) an entire vehicle speed region at backward running of the vehicle.

13. A steering control device for a vehicle according to claim 12, wherein said second vehicle speed region includes a region smaller than 0 km/hr and a region greater than 3.0 km/hr.

14. A steering control device for a vehicle according to claim 9, wherein when the vehicle is turning at a speed within a high vehicle speed region at forward running of the vehicle that exceeds a low vehicle speed region, a steering characteristic is a neutral-steering state or an under-steering state.

15. A steering control device for a vehicle according to claim 9, wherein if said steering angle is further increased toward said limit steering angle during stationary turning of the vehicle, the outer wheel speed during turning of the vehicle is increased.

16. A steering control device for a vehicle according to claim 9, wherein each of said hydraulic pumps has a swash plate shaft, and said swash plate shaft of the hydraulic pump of at least one of said pair of continuously variable transmissions is provided with a pump volume-fine adjusting mechanism for finely adjusting a discharge amount of oil.

17. A steering control device for a vehicle according to claim 16, wherein said pump volume-fine adjusting mechanism includes means for changing an arm length of a speed adjusting member provided on said swash plate shaft.

18. A steering control device for a vehicle comprising:
a steering wheel;
a pair of continuously variable transmissions;
left and right driven wheels connected to said pair of continuously variable transmissions and driven independently;
left and right wheels to be steered which are connected to said steering wheel;
a control means for controlling a transmission ratio of said pair of continuously variable transmissions in accordance with a steering angle of the steering wheel so as to turn the vehicle, said control means including
a mixing lever pivotally supported at one end thereof for longitudinal swinging movement and lateral swinging movement so as to operate a speed adjusting member for each of the pair of continuously variable transmissions to control the transmission ratio of said pair continuously variable transmissions,
a change lever for longitudinally swinging said mixing lever to increase or decrease the number of rotations of said pair of continuously variable transmissions at substantially the same values, and
a guide member laterally swung by said steering wheel and having a guide groove which extends longitudinally and into which the other end of said mixing lever is loosely fitted, wherein
a width of said guide groove in a lateral direction a) is set wide at a position thereof corresponding to a low speed when said mixing lever is at forward running of the vehicle and at backward running of the vehicle, and b) is set narrow at a position thereof corresponding to a high speed when said mixing lever is at forward running of the vehicle.

19. A steering control device for a vehicle according to claim 18, wherein the width of said guide groove in the lateral direction is set widest at a position thereof corresponding to said mixing lever at a position of stoppage of the vehicle.

20. A steering control device for a vehicle according to claim 18, wherein said guide groove is formed into a gourd shape.

21. A steering control device for a vehicle according to claim 18, wherein said guide groove is formed in a guide plate, and said guide plate is mounted to an elongated hole formed in said guide member such that a lateral position of said guide plate can be adjusted.

22. A steering control device for a vehicle according to claim 19, wherein each of said pair of continuously variable transmissions is a hydrostatic continuously variable transmissions having a hydraulic motor and a hydraulic pump having a swash plate shaft, and said swash plate shaft of the hydraulic pump of at least one of said pair of continuously variable transmissions is provided with a pump volume-fine adjusting mechanism for finely adjusting a discharge amount of oil.

23. A steering control device for a vehicle according to claim 22, wherein said pump volume-fine adjusting mechanism includes means for changing an arm length of a speed adjusting member provided on said swash plate shaft.

* * * * *